(12) United States Patent
McGrath

(10) Patent No.: US 11,762,642 B2
(45) Date of Patent: Sep. 19, 2023

(54) MEETING SURVEY SYSTEM

(71) Applicant: MEETINGQUALITY PTY. LTD., New South Wales (AU)

(72) Inventor: Kelvin McGrath, New South Wales (AU)

(73) Assignee: MEETINGQUALITY PTY. LTD., New South Wales (AU)

( * ) Notice: Subject to any disclaimer, the term of this patent is extended or adjusted under 35 U.S.C. 154(b) by 0 days.

(21) Appl. No.: 17/051,492

(22) PCT Filed: Apr. 29, 2019

(86) PCT No.: PCT/AU2019/050385
§ 371 (c)(1),
(2) Date: Oct. 29, 2020

(87) PCT Pub. No.: WO2019/210355
PCT Pub. Date: Nov. 7, 2019

(65) Prior Publication Data
US 2021/0224052 A1   Jul. 22, 2021

(30) Foreign Application Priority Data

Apr. 29, 2018   (AU) .............................. 2018901415

(51) Int. Cl.
*G06F 8/54*   (2018.01)
*G06Q 10/107*   (2023.01)
(Continued)

(52) U.S. Cl.
CPC .............. *G06F 8/54* (2013.01); *G06Q 10/107* (2013.01); *G06Q 10/1095* (2013.01); *G06F 40/166* (2020.01); *H04L 67/02* (2013.01)

(58) Field of Classification Search
CPC ....... G06F 8/54; G06F 40/166; G06Q 10/107; G06Q 10/1095; H04L 67/02
(Continued)

(56) References Cited

U.S. PATENT DOCUMENTS

| 6,189,029 B1 * | 2/2001 | Fuerst .................... G06Q 30/02 715/255 |
| 10,475,100 B1 * | 11/2019 | Herz .................. G06Q 30/0629 |

(Continued)

FOREIGN PATENT DOCUMENTS

| GB | 2351574 A | 1/2001 |
| WO | 2007118273 A1 | 10/2007 |

OTHER PUBLICATIONS

Anonymous, "Dictionary Look-up Macros for Translators", Internet Citation, pp. 1-23.

(Continued)

*Primary Examiner* — Alan S Chou
(74) *Attorney, Agent, or Firm* — Hayes Soloway PC

(57) ABSTRACT

A method of communicating survey questions to a list of participants; the list of participants obtained by including a proxy email address as a participant address in a list of participant email addresses whereby a web enabled server receiving an invitation addressed to the proxy email address also receives the list of participant email addresses; the web enabled server subsequently transmitting survey questions to the participants identified by the list of participant email addresses. Also disclosed is method of assembling programme code for execution on a platform. Also disclosed is a portal which provides a facility for additional communication to be added to meeting results. The communication will be altered to the specific preferences of each recipient and will be added to any Communication that is to be sent by MeetingQuality within the specified timeframe.

18 Claims, 30 Drawing Sheets

(51) Int. Cl.
 *G06Q 10/1093* (2023.01)
 *G06F 40/166* (2020.01)
 *H04L 67/02* (2022.01)

(58) Field of Classification Search
 USPC .......................................................... 717/162
 See application file for complete search history.

(56) References Cited

U.S. PATENT DOCUMENTS

| | | | |
|---|---|---|---|
| 2003/0204437 A1* | 10/2003 | Flender | G06Q 30/0203 705/7.32 |
| 2005/0015362 A1 | 1/2005 | Ostertag et al. | |
| 2007/0192166 A1* | 8/2007 | Van Luchene | G06Q 30/02 705/14.54 |
| 2008/0300967 A1 | 12/2008 | Buckley et al. | |
| 2010/0146058 A1* | 6/2010 | Naef | G06Q 10/109 709/206 |
| 2013/0111323 A1* | 5/2013 | Taghaddos | G06F 40/174 715/223 |
| 2015/0032658 A1 | 1/2015 | Pantaliano et al. | |
| 2015/0178054 A1 | 6/2015 | Delsart | |
| 2015/0242865 A1 | 8/2015 | Richards | |
| 2016/0134429 A1 | 5/2016 | Shimada | |
| 2017/0032395 A1* | 2/2017 | Kaufman | G06F 3/0482 |
| 2018/0060883 A1 | 3/2018 | Cheesman et al. | |
| 2018/0308113 A1* | 10/2018 | Kopikare | G06Q 10/1095 |

OTHER PUBLICATIONS

Jerome Mutterer, "Imaged Macro Language Programmer's Reference Guide", Internet Citation, pp. 1-45.
Anonymous, "ImageJ Release Notes", Internet Citation, pp. 1-100.

* cited by examiner

MeetingQuality Patent Discussion

Measure MeetingQuality <measure@meetingquality.com>
Thu 18/01/2018, 3:31 PM
Wallington-Dummer ⌄

↩ Reply all | ⌄

Inbox

MeetingQuality

MeetingQuality Patent Discussion
January 18, 2018 3:30 pm (Australia/Sydney)

MeetingQuality is an independent service that assesses the quality of your meeting.

Each attendee of the meeting has been emailed two ways to provide their individual assessment. You can either respond using the web here or, hit Reply, then Scroll down and answer the questions below:

Meeting Purpose
What was the main purpose of the Meeting? Replace [ ] with [y] in the square brackets of your choice:
    [ ] Make Decisions
    [ ] Make Plans    17
    [ ] Generate Ideas
    [ ] Communicate Info
    [ ] Don't Know

Meeting Assessment
Overall how satisfied were you with the Meeting? Replace [ ] with [y] in one of the square brackets of your choice:
    [ ] Completely satisfied
    [ ] Satisfied    17
    [ ] Neither satisfied nor dissatisfied
    [ ] Dissatisfied
    [ ] Completely dissatisfied Please rate each Attendee's Contribution by replacing [ ] with [y] in the square brackets for a very positive contribution or [n] in the square brackets for a negative contribution. For an average contribution, leave the contents of the square brackets in their original state.
    [ ] Kelvin McGrath
    [ ] mail2@wallington-dummer.com

16

Place Feedback between the square brackets below and it will be sent to each attendee. Note you will not be identified as the author.
*[Replace this text with feedback].*

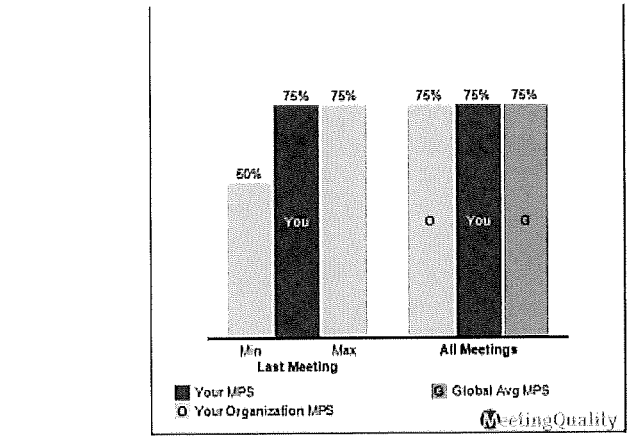

19B

Quality of the Meeting
The quality (MQS) of the last meeting has been calculated to be 69% which is considered Acceptable. This is shown graphically below.

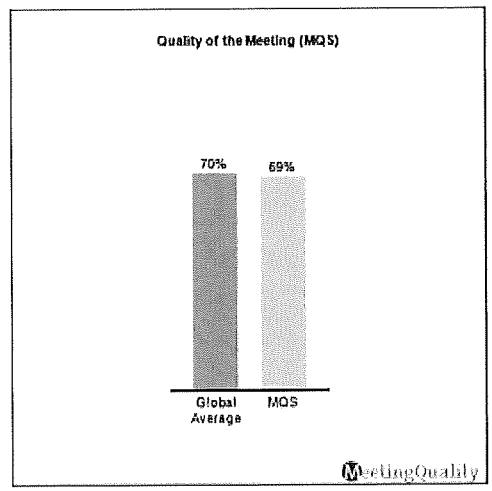

Action Items
- Great meeting!

Thank you for using MeetingQuality.

[ ] Forget Me To remove the history of all your responses and not to be listed as an attendee at any future meetings. Hit reply. Scroll down to here and place an x between the square brackets, then send the email.
[ ] Unsubscribe To Unsubscribe to MeetingQuality emails. Hit reply. Scroll down to here and place an x between the square brackets, then send the email.

Fig 3B

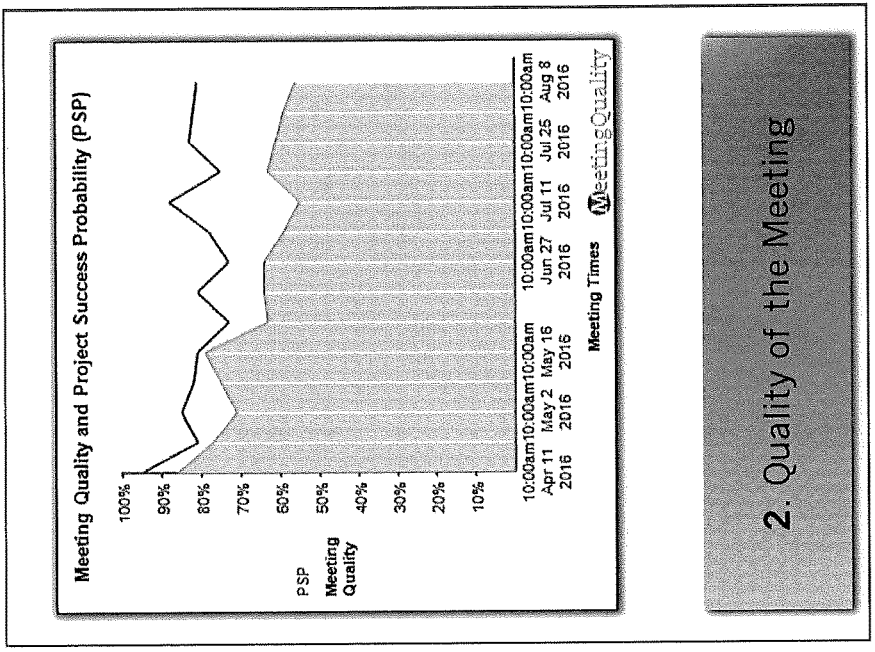
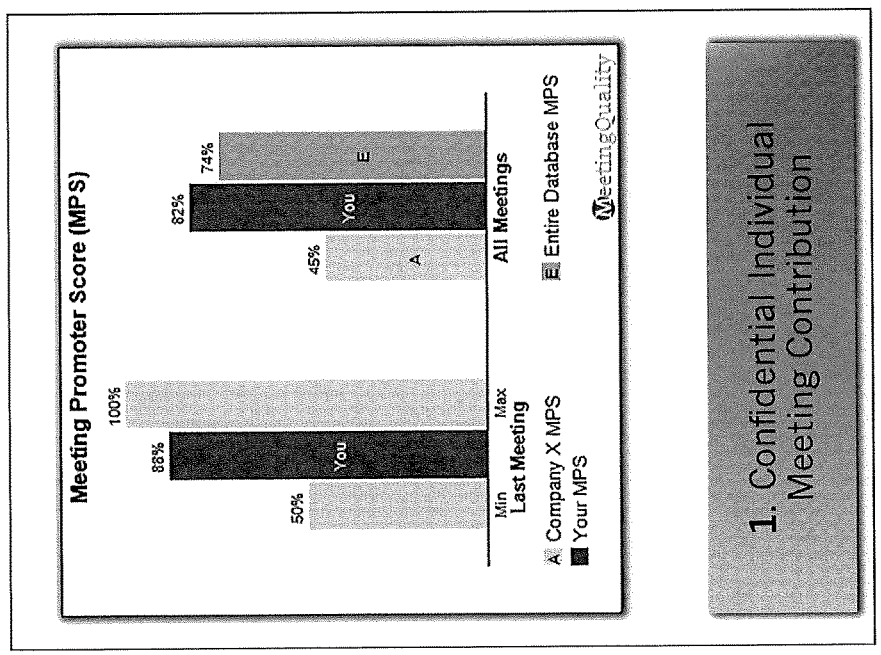
Fig 6

Monthly Reporting (Waterfall)

Portfolio Meeting Promoter Score (MPS) and Meeting Quality Score (MQS)

| Project | Steering Committee | | Project Team | | Stakeholders | |
|---|---|---|---|---|---|---|
| | MQS | PSP | MQS | PSP | MQS | PSP |
| Project A | 68% | 75% | 72% | 56% | 65% | 71% |
| Project B | 54% | 80% | 35% | | 59% | |
| Project C | 80% | 74% | 68% | 76% | 73% | 78% |

Watermelon Project (Green on the outside Red on the inside)

Portfolio Governance

| Project | Last | Scp | Cst | Res | Ben | Chg | Mtg |
|---|---|---|---|---|---|---|---|
| Project A | Jul | 65% | 75% | | 95% | 67% | 81% |
| Project B | Jul | | 72% | | 79% | 61% | |
| Project C | Sep | 90% | 85% | 70% | 92% | 78% | 90% |

Scp = Scope, Cst = Cost, Res = Resources, Ben = Benefits, Chg = Change and Mtg = Meetings

Fig 7

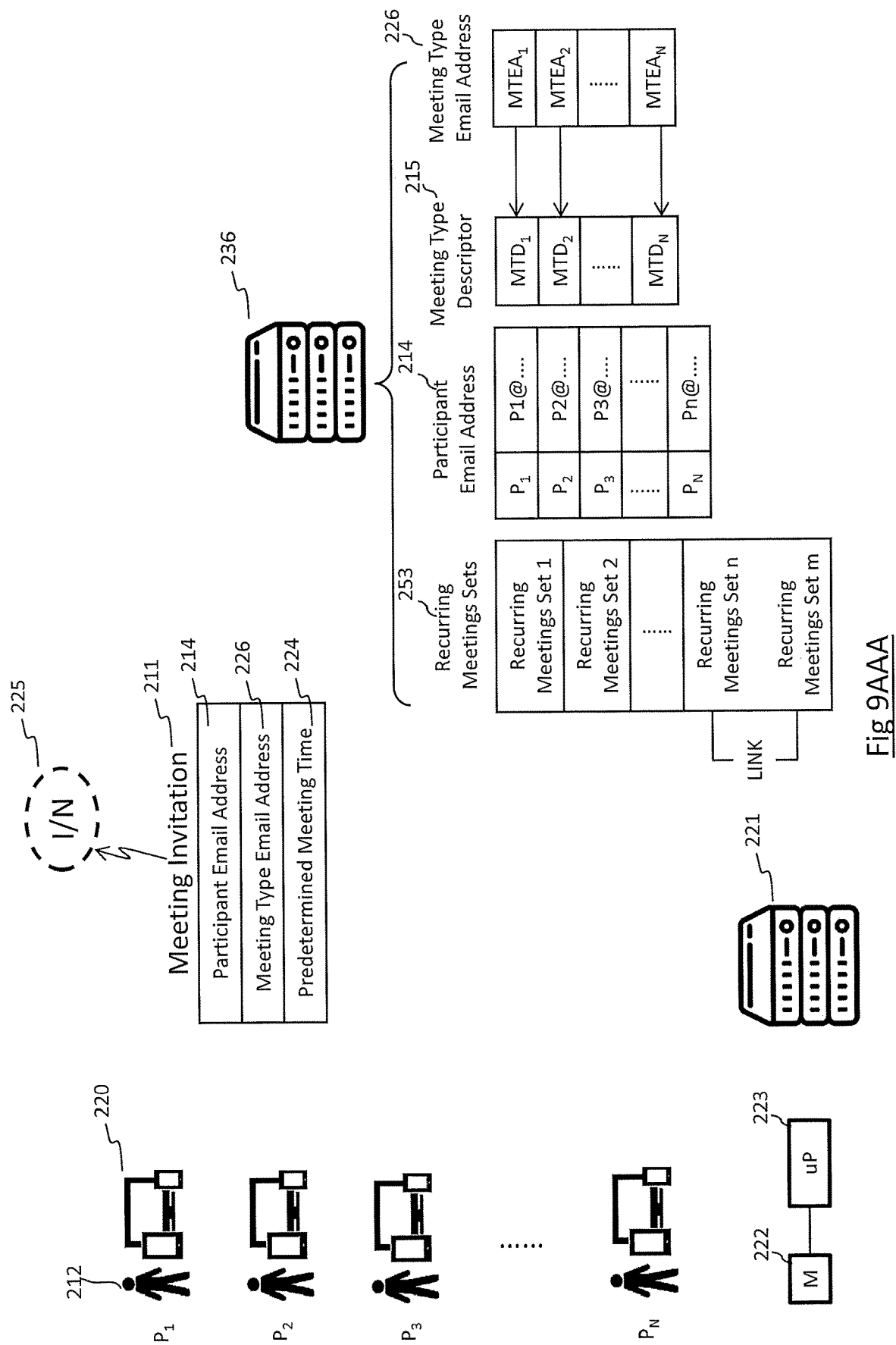

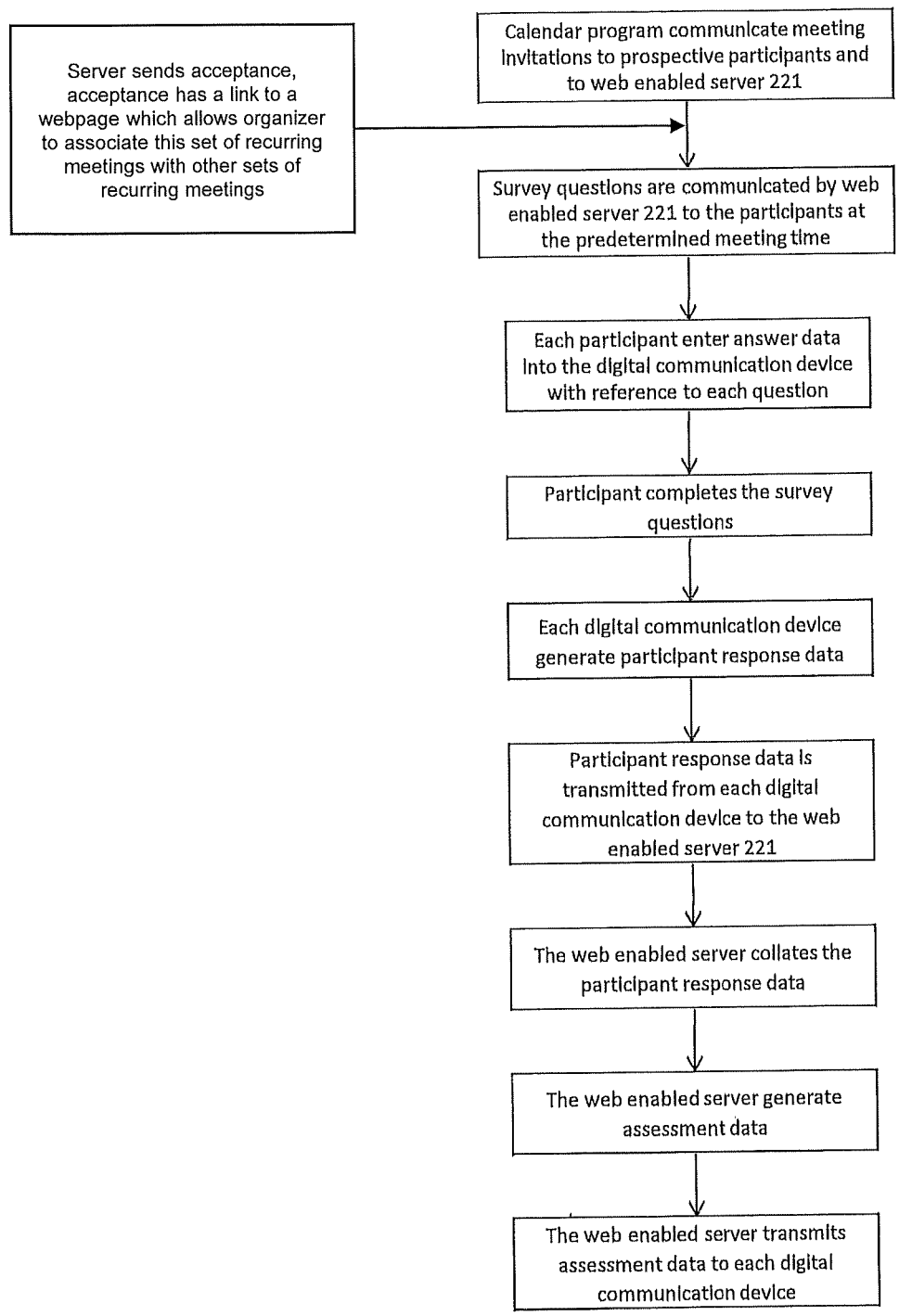
Fig 9AAAA

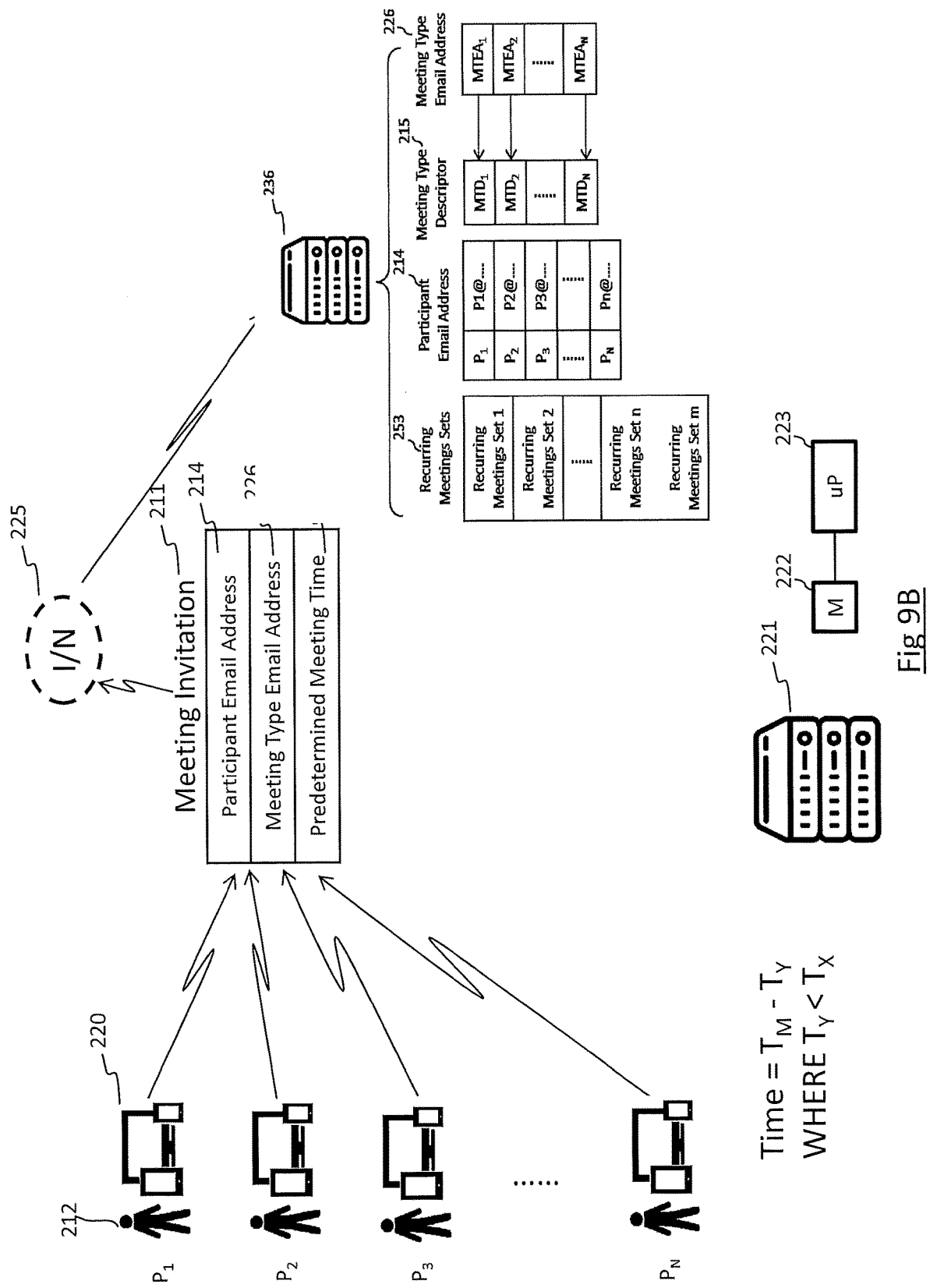

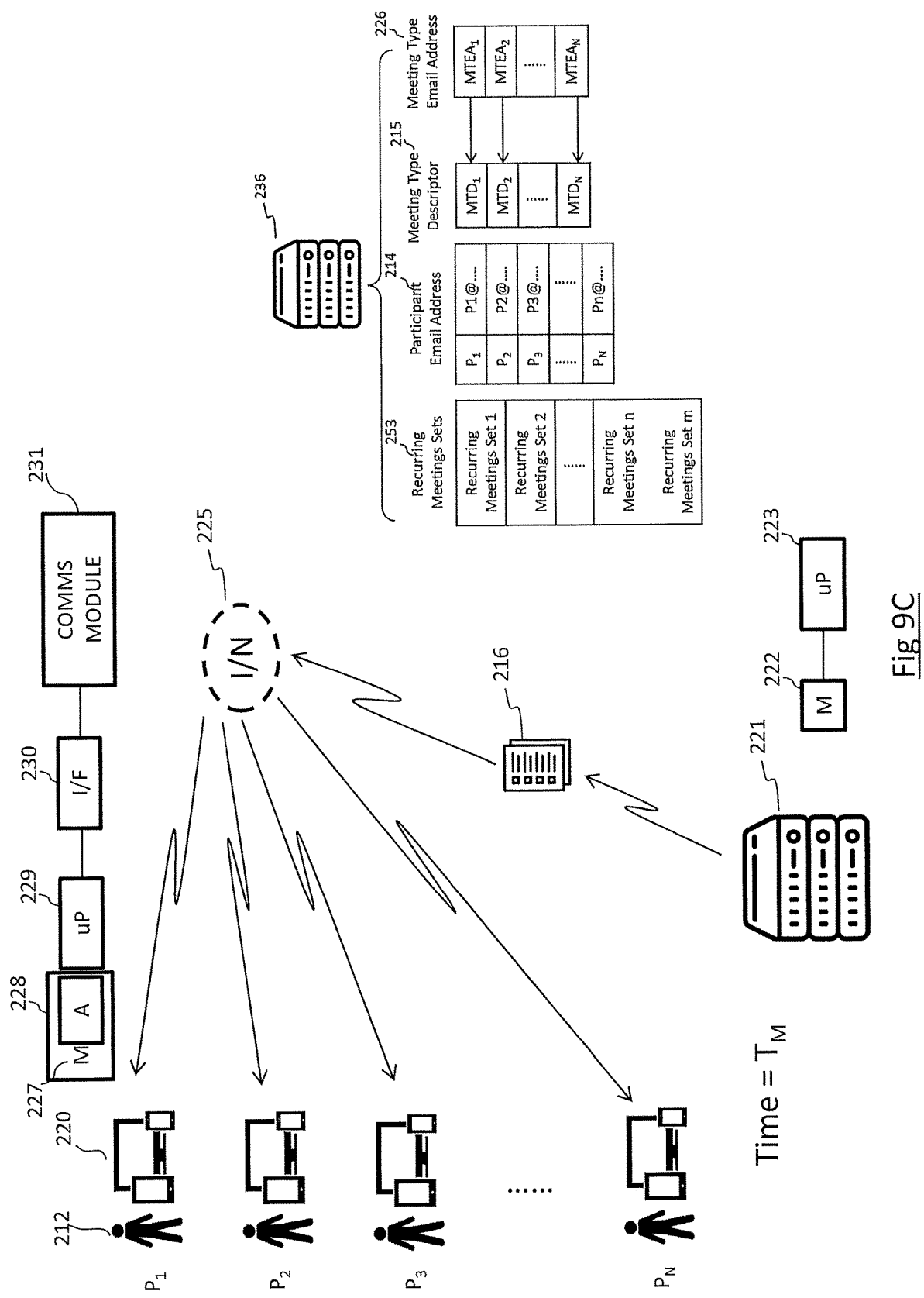

EMAIL RECIEVED AS MEETING STARTS

MeetingQuality

MeetingQuality Patent
March 20, 2019 11:00 am (Australia/Sydney)

MeetingQuality is an independent service that assesses the quality of your meeting. By selecting a ○ below your score will be updated on a results page where you can compare your score to other attendees. You will also be able to modify your score and provide further details.

Meeting Assessment
Overall how satisfied were you with the Meeting?
○ Completely satisfied
○ Satisfied
○ Neither satisfied or dissatisfied
○ Dissatisfied
○ Completely dissatisfied Thank you for using MeetingQuality. You will receive your personalised confidential assessment report for this meeting at March 21, 2019 12:00 pm. Any responses received after this time will not be incorporated into the results email although they will be taken into account for aggregation purposes.

HYPERLINKS

SERVER

1. Determine if hyperlink tampered. If tampered drop connection
2. Update database with explicit selection
3. Update database with implicit selection if not previously updated
4. Serve out results plus an opportunity to change

PARTIAL BROWSER DISPLAY BASED ON CLICKING ON TOP HYPERLINK IN EMAIL

MeetingQuality

MeetingQuality Patent
March 20, 2019 11:00 am (Australia/Sydney)

MeetingQuality is an independent service that assesses the quality of your meeting.

Meeting Assessment
3 responses have been received. The most chosen value is Completely satisfied which was chosen by 0 responders.
Please complete your assessment of this meeting.

Overall how satisfied were you with the Meeting?
⦿ Completely satisfied
○ Satisfied
○ Neither satisfied or dissatisfied
○ Dissatisfied
○ Completely dissatisfied

Project Success Probability
Please provide your assessment of the likely success of the project between 0 and 100%
[50 ⌄]%

MQProfile
Please select 5 descriptors that best represent your way of thinking in a typical day to day context.

| | |
|---|---|
| Results focussed | Ideas generator |
| Welcomes challenges | Colloborative |
| Independent-minded | Sociable |
| Decisive | Energetic |
| Direct | Optimistic |
| Adventurous | Self-assured |
| | |
| Reflective | Persistent |
| Systematic | Good Listener |
| Objective | Patient |

Fig 9CC

| | Pattern | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|---|---|
| 1 | Pattern | | | | | | | | | | | | | | | | | | | | | | | | | | | | | |
| 2 | | | | | | | | | | | | | | | | | | | | | | | | | | | | | | |
| 3 | Questions | | | | | | | | | | | | | | | | | | | | | | | | | | | | | |
| 4 | Checkboxes | x | | | | | | | | | | | | | | | | | | | | | | | | | | | | x |
| 5 | 5 radio buttons (1) | x | x | | x | x | x | x | x | | | x | | x | | | | | x | | | | | | | | x | | | |
| 6 | 5 Radio buttons (2) | | | | | | | | x | x | | | | | | | | | | x | | | | | | | | | | |
| 7 | 5 Radio buttons (3) | | | | | | | | | x | x | | | | | | | | | | x | | | | | | | | | |
| 8 | Attendee contribution | x | x | | | x | x | | | | x | | | | | | | | | | | | | | | | x | x | | |
| 9 | Input 0 to 100 | x | x | | | x | x | | | | | | | | x | | | | | | | | | | | | | | | |
| 10 | 4th meeting governance | | | | | | | | x | | | | | | | | | | | | | | | | | | | | | |
| 11 | input 0 to 10 (1) | | | x | x | | | | | | | | | | | | | x | x | x | | x | x | | | | | | | |
| 12 | input 0 to 10 (2) | | | x | x | | | | | | | | | | | | | x | x | | x | x | x | | | | | | | |
| 13 | input 0 to 10 (3) | | | | | | | | | | | | | | | | | x | x | | | x | x | | | | | | | |
| 14 | input Double 0 to 10 | | | | | | x | x | x | | | x | x | | | x | | | | | | | | | | | | | | |
| 15 | 3 radio button | | | | | x | x | x | x | x | x | x | | x | x | x | x | x | x | x | | | x | x | x | x | | | | |
| 16 | Feedback | x | x | x | x | x | x | x | x | x | x | x | x | | x | | x | | | | | | | | | | | | | |
| 17 | Attendee Advice (user defined contribution) | | | | | | | | | | | | | | | x | | | | | | | | | | | | | | |
| 18 | | | | | | | | | | | | | | | | | | | | | | | | | | | | | | |
| 19 | Responses | | | | | | | | | | | | | | | | | | | | | | | | | | | | | |
| 20 | Bar Chart 2x3 | x | x | x | x | x | x | | x | | | | | x | | | | | | | | | | | | | | | | |
| 21 | Bar Chart 3x3 | | | | x | | | | | | | | | | | | | | | x | x | | x | | | | | | | |
| 22 | Bar Chart 5x2 | | | | | x | | | | | | | | | | | | | | | | | | | | | | | | |
| 23 | Bar Chart Overlay | | | | | | x | x | x | x | x | x | x | | | x | | | | | | x | x | | | x | | | | |
| 24 | Time Series | | | | | | | | | | | | | | | | | 3 | 3 | 3 | 3 | x | x | | | x | x | x | | |
| 25 | Scatter Graph | | | x | | | | | | | | | | | | | | | | | | | | x | x | | | | x | |
| 26 | Network Diagram | | | | | | | | | | | | | | | x | | | | | | x | | | | | x | | x | |
| 27 | Tables | x | x | x | x | x | x | | | | | | | | | | | | | | | | | x | x | | x | | x | x |
| 28 | | | | | | | | | | | | | | | | | | | | | | | | | | | | | | |
| 29 | Email Addresses (@meetingquality.com) | | | | | | | | | | | | | | | | | | | | | | | | | | | | | |
| 30 | measure — 250 | x | | | | | | | | | | | | | | | | | | | | | | | | | | | | |
| 31 | measure.se | x | | | | | | | | | | | | | | | | | | | | | | | | | | | | |
| 32 | project | | | x | | | | | | | | | | | | | | | | | | | | | | | | | | |
| 33 | project.se | | | x | | | | | | | | | | | | | | | | | | | | | | | | | | |
| 34 | contract | | | x | | | | | | | | | | | | | | | | | | | | | | | | | | |
| 35 | contract.se | | | x | | | | | | | | | | | | | | | | | | | | | | | | | | |
| 36 | boqpc | | | x | | | | | | | | | | | | | | | | | | | | | | | | | | |

PARAMETERS

| Paragraph | Question | Text |
|---|---|---|
| 0 | | `<html><head><meta http-equiv="Content-Type" content="text/html; charset=utf-8"\></head><body dir="auto"\><div><br><div><style>@media only screen and (max-width:560px) {\.mobile-hide {display:none!important}\.mobile-wide {float:none!important}\.mobile-block {display:block!important; width:100%!important}\\.footer-ios-trigger-link a {color: #999;text-decoration: none;}}</style>\<table role="presentation" align="center" style="border-collapse:collapse; width:98%; background-color:#eeeeee; word-wrap:break-word;">\<tbody><tr><td style="padding:12px 2px 0 2px;"\><table role="presentation" align="center" class="mobile-wide" style="width:552px; border-collapse:collapse;">\<tbody><tr><td style="padding:0 12px;"><table role="presentation" align="center" style="border-collapse:collapse; width:95%;">\<tbody><tr><td style="padding:0 12px;"><a href="http://www.meetingquality.com" style="font-family:Palatino Linotype\Palatino\New York\MS Serif\Georgia; line-height:1.3;text-decoration:none; color:#da3f2b; font-size:24px; margin:0;">M</a><a href="http://www.meetingquality.com" style="font-family:Palatino Linotype\Palatino\New York\MS Serif\Georgia; line-height:1.3;text-decoration:none; color:#a0a0a0; font-size:24px; margin:0;">eetingQuality</a></td></tr></tbody></table></td></tr><td style="padding:18px 0; background-color:#FFFFFF;"><table role="presentation" align="center" style="border-collapse:collapse; 0; background-color:#da3f2b; border-top:solid 1px #ddd; border-bottom:solid 1px #bbb;"><table role="presentation" align="center" style="border-collapse:collapse; width:95%;"><tbody><tr><td style="padding: 0 12px;"><h2 style="font-family:Helvetica\Arial\sans-serif; line-height:1.3;color:#FFFFFF;font-size:18px;padding:0;margin:0;font-weight:bold;">\%kTitle%k<br>%kStartDateTime%k</h2></td></tr></tbody></table></td></tr><tbody><tr><td style="padding:0 12px;"><style>@media only screen and (max-width:560px) {\.reply [padding:5px 0 0 15px!important}\}</style><table style="border-collapse:collapse; width:100%;" role="presentation"><tbody><tr><td style="font-family:Helvetica\Arial\sans-serif; line-height:1.3; text-decoration:none;font-size:16px; padding:0;">` |
| 1 | 0 | `<table style="border-collapse:collapse; width:100%;" role="presentation"><tbody><tr><td style="font-family:Calibri\Arial\Helvetica\sans-serif; line-height:1.3; text-decoration:none;font-size:16px; color:#333; padding:0;"><br>MeetingQuality is an independent service that assesses the quality of your meeting. <br><br>Each attendee of the meeting has been emailed two ways to provide their individual assessment. You can either respond using the web <a href="https://meetingeq.com/WebQuestions?c=%kCalendar%k&e=%kAttendee%k&p=%kWebPassword%k">here</a><br>or\ <b>hit Reply</b> then Scroll down and answer the questions below:</td></tr></tbody></table>` |
| 1 | 0 | `<table style="border-collapse:collapse; width:100%;" role="presentation"><tbody><tr><td style="font-family:Calibri\Arial\Helvetica\sans-serif; line-height:1.3; text-decoration:none;font-size:16px; color:#333; padding:0;"><br><b>What was the main purpose of the Meeting? Replace [ ] with [y] in the square brackets of your choice:</td></tr></tbody></table>` 252 |
| 2 | 1 | `<table style="border-collapse:collapse; width:100%;" role="presentation"><tbody><tr><td style="font-family:Calibri\Arial\Helvetica\sans-serif; line-height:1.3; text-decoration:none;font-size:16px; color:#333; padding:0 0 0 10px;">"> [ ]</td><td valign="top" style="font-family:Calibri\Arial\Helvetica\sans-serif; line-height:1.3; text-decoration:none;font-size:16px; color:#333; padding:0 0 0 4px;">\Make Decisions</td></tr></tbody></table>` |
| 2 | 1 | `<table style="border-collapse:collapse; width:100%;" role="presentation"><tbody><tr><td style="font-family:Calibri\Arial\Helvetica\sans-serif; line-height:1.3; text-decoration:none;font-size:16px; 88504711841 0<table style="border-collapse:collapse; width:100%; font-family:Calibri\Arial\Helvetica\sans-serif; font-size:16px;" role="presentation"><tbody><tr><td style="font-family:Calibri\Arial\Helvetica\sans-serif; line-height:1.3; text-align="right" style="width:33px; font-size:16px; color:#333; padding:0 0 0 0 10px;">"> [ ]</td><td valign="top" style="font-family:Calibri\Arial\Helvetica\sans-serif; line-height:1.3; text-decoration:none;font-size:16px; color:#333; padding:0 0 0 4px;">\Make Plans</td></tr></tbody></table>` |
| 2 | 1 | `<table style="border-collapse:collapse; width:100%;" role="presentation"><tbody><tr><td style="font-family:Calibri\Arial\Helvetica\sans-serif; line-height:1.3; text-decoration:none;font-size:16px; style="width:33px; font-size:16px; color:#333; padding:0 0 0 10px;">"> [ ]</td><td valign="top" style="font-family:Calibri\Arial\Helvetica\sans-serif; line-height:1.3; text-decoration:none;font-size:16px; color:#333; padding:0 0 0 4px;">\Generate Ideas</td></tr></tbody></table>` |
| 2 | 1 | `<table style="border-collapse:collapse; width:100%;" role="presentation"><tbody><tr><td style="font-family:Calibri\Arial\Helvetica\sans-serif; line-height:1.3; text-decoration:none;font-size:16px; style="width:33px; font-size:16px; color:#333; padding:0 0 0 0 10px;">"> [ ]</td><td valign="top" style="font-family:Calibri\Arial\Helvetica\sans-serif; line-height:1.3; text-decoration:none;font-size:16px; color:#333; padding:0 0 0 4px;">\Communicate Info</td></tr></tbody></table>` 252 |

Fig 11

```html
<tr>
<td style="padding:12px 6px;">
<table role="presentation" style="border-collapse:collapse; width:100%;">
<tbody>
<tr><td style="font-family:Calibri,Arial,Helvetica,sans-serif; line-height:1.3;color:#666; font-size:10px; padding:0; text-align:center">
All rights reserved. Copyright 2013-2018<a href="http://www.meetingquality.com">
MeetingQuality Pty Ltd</a></td>
</tr>
<tr><td style="font-family:Calibri,Arial,Helvetica,sans-serif; line-height:1.3;color:#666; font-size:10px; padding:0; text-align:center">
31 Mountain View Cres, West Pennant Hills, Sydney, NSW Australia</td>
</tr>
<tr><td style="font-family:Calibri,Arial,Helvetica,sans-serif; line-height:1.3;color:#666; font-size:10px; padding:0; text-align:center">
kVersion:%kVersion%k:</td>
</tr>
<tr><td style="font-family:Calibri,Arial,Helvetica,sans-serif; line-height:1.3;color:#666; font-size:10px; padding:0; text-align:center">
kCalendar:%kCalendar%k:</td>
</tr>
</tbody>
</table>
</td>
</tr>
</tbody>
</table>
</td>
</tr>
</tbody>
</table>
</div>
</body>
</html>
```

Fig 12

```
| 1447228 | 18 |    4 |  12 |  -1 |  10 | Feedback
|      3 |  0 |
| 1447229 | 19 |    4 |  12 |  -2 |  10 | Place Feedback below and it will be sent to
each Attendee:                  |     3 |  0 |
| 1447230 | 20 |    4 |  12 |   1 |  10 |
|      3 |  0 |
```

Fig 13

```
<table role="presentation" style="border-collapse:collapse; width:100%;">
<tbody>
<tr><td style="font-family:Helvetica,Arial,sans-serif; line-height:1.3;color:#666; font-
size:10px; padding:0; text-align:"center"">
[ ] <b>Forget Me</b> To remove the history of all your responses and not to be listed as an
attendee at any future meetings. Hit reply, Scroll down to here and place an x between the
square brackets, then send the email.</td>
</tr>
<tr><td style="font-family:Helvetica,Arial,sans-serif; line-height:1.3;color:#666; font-
size:10px; padding:0; text-align:"center"">
[ ] <b>Unsubscribe</b> To Unsubscribe to MeetingQuality emails. Hit reply, Scroll down to
here and place an x between the square brackets, then send the email.</td>
</tr>
<tr><td style="font-family:Helvetica,Arial,sans-serif; line-height:1.3;color:#666; font-
size:10px; padding:0; text-align:"center"">
All rights reserved. Copyright 2013-2018<a href="http://www.meetingquality.com">
MeetingQuality Pty Ltd</a></td>
</tr>
<tr><td style="font-family:Helvetica,Arial,sans-serif; line-height:1.3;color:#666; font-
size:10px; padding:0; text-align:"center"">
31 Mountain View Cres, West Pennant Hills, Sydney, NSW Australia</td>
</tr>
<tr><td style="font-family:Helvetica,Arial,sans-serif; line-height:1.3;color:#666; font-
size:10px; padding:0; text-align:"center"">
kVersion:2:</td>
</tr>
<tr><td style="font-family:Helvetica,Arial,sans-serif; line-height:1.3;color:#666; font-
size:10px; padding:0; align="center"">
kCalendar:%kCalendar%k.%kAttendee%kh:</td>
</tr>
</tbody>
</table>
</td>
</tr>
</tbody>
</table>
</td>
</tr>
</tbody>
</table>
</div>
</body>
</html>
```

Fig 14

```
<tr><td style="font-family:Calibri,Arial,Helvetica,sans-serif; line-height:1.3;color:#666; font-size:10px; padding:0; text-align:center">
31 Mountain View Cres, West Pennant Hills, Sydney, NSW Australia</td>
</tr>
<tr><td style="font-family:Calibri,Arial,Helvetica,sans-serif; line-height:1.3;color:#666; font-size:10px; padding:0; text-align:center">
kVersion:%kVersion%kR:</td>
</tr>
<tr><td style="font-family:Calibri,Arial,Helvetica,sans-serif; line-height:1.3;color:#666; font-size:10px; padding:0; text-align:center">
kCalendar:%kCalendar%k:</td>
</tr>
</tbody>
</table>
</td>
</tr>
</tbody>
</table>
</td>
</tr>
</tbody>
</table>
</div>
</body>
</html>
```

Fig 15

{"Results": {"Calendar": "%kCalendar%k","Items": [{"t":0,"sT":1,"f1":1,"f2":0,"s1":"Attendee MPS
MPS"}%kContribution%k(%kCalendar%k)[,{"t":1,"sT":%kContributionRater%k,"f1":%kContributionRating%k,"f2":%kContributionRatee%k,"s1":""}]%k/Contribution%k,{"t":0,"sT":2,"f1":2,"f2":0,"s1":""},{"t":2,"sT":-3,"f1":0,"f2":0,"s1":"All Meetings"},{"t":2,"sT":-2,"f1":0,"f2":0,"s1":"This Meeting"},{"t":2,"sT":-1,"f1":0,"f2":0,"s1":"Meeting Promoter Score (MPS)"},{"t":2,"sT":1,"f1":%kLastMeetingMPSMin%k,"f2":13882323,"s1":"
Min "},{"t":2,"sT":2,"f1":%kLastMeetingMPSYou%k,"f2":14303019,"s1":"You Your MPS"},{"t":2,"sT":3,"f1":%kLastMeetingMPSMax%k,"f2":13882323,"s1":"
Max "},{"t":2,"sT":4,"f1":%kAllMeetingAttendeeAverageOrgMPS%k10%k/AllMeetingAttendeeAverageOrgMPS%k,"f2":13882323,"s1":"O O
Your Organization MPS"},{"t":2,"sT":5,"f1":%kAllMPSYou%k,"f2":14303019,"s1":"You "},{"t":2,"sT":6,"f1":%kAllMeetingGlobalAverageMPS%k,"f2":11053224,"s1":"G G
Global Avg MPS"},{"t":0,"sT":100,"f1":3,"f2":0,"s1":""},{"t":3,"sT":-6,"f1":1,"f2":14408667,"s1":"MQS"},{"t":3,"sT":-5,"f1":2,"f2":14737632,"s1":""},{"t":3,"sT":-3,"f1":%kAverageCalendarRating%k[-1,30][2,3.125][1,20]%k/AverageCalendarRating%k,"f2":14303019,"s1":"Global Average"},{"t":3,"sT":-2,"f1":0,"f2":0,"s1":"Meeting Date"},{"t":3,"sT":-1,"f1":0,"f2":0,"s1":"Quality of the Meeting (MQS)"}%kRecurring%k(%kCalendar%k)[<"t":3,"sT":1,"f1":%kRecurringCalendarRating%k[-1,30][2,3.125][1,20]%k/RecurringCalendarRating%k,"f2":%kRecurringSecondsSince1970%k,"s1":""><"t":3,"sT":2,"f1":%kRecurringCalendarRating%k[-1,30][2,3.125][1,20]%k/RecurringCalendarRating%k,"f2":%kRecurringSecondsSince1970%k,"s1":""> ]%k/Recurring%k,{"t":4, "sT":0, "f1":0, "f2":0, "s1 ": "%kAction Items%k"}]}}

Fig 16

MEETING SURVEY SYSTEM

CROSS-REFERENCE TO RELATED APPLICATIONS AND PRIORITY

This patent application claims priority from PCT Patent Application No. PCT/AU2019/050385 filed Apr. 29, 2019, which claims priority from AU Patent Application No. 2018901415 filed Apr. 29, 2018. Each of these patent applications are herein incorporated by reference in its/their entirety.

TECHNICAL FIELD

The present invention relates to a meeting survey system and, more particularly but not exclusively, to a system for assessing the quality of a meeting and more preferably a contiguous and/or recurring series of meetings. The meeting may relate to a wide variety of endeavours. The endeavour may take forms such as projects, customer acquisition, coaching, recruitment, safety, risk or culture.

The invention also relates to coding methodology including methods of and systems for operating a computer and associated systems and servers in order to provide tools for operating the meeting survey system.

The invention further relates to Communication Drop functionality, which is employed to target communications using the style of language that is most likely to resonate with the recipient.

BACKGROUND

Meetings either in person around a conference table or meetings taking place between individuals via an electronic hook-up are a necessary part of corporate life.

All but the smallest projects require the participation of many people. In many instances, particularly where a project is large and complex the participants will be divided into groups and subgroups—each responsible for delivering a specified aspect or 'deliverable'. Embodiments of the present invention as described below illustrate how the meeting survey system relates to a wide variety of endeavours. The endeavours may be in the forms such as projects, customer acquisition, coaching, recruitment, safety, risk or culture.

It can be difficult to assess the extent to which any meeting or even a series of meetings are advancing the project. Heretofore any such assessment has been subjective.

It would be helpful if a mechanism existed for quantifying the extent to which any meeting or even a series of meetings are advancing a project.

It would also be helpful to provide software structures and systems to give effect to this.

It would further be helpful if feedback could be provided to all attendees at a meeting.

It would further be helpful if feedback could be provided to attendees in real time or substantially real time as the meeting progresses.

It would further be helpful if the feedback could be aided by reference to responses provided by attendees in previous meetings.

It is an object of the present invention to address or at least ameliorate some of the above disadvantages or provide a useful alternative.

US2018/0060883 (Cheesman/Qualtrics) discloses a similar area of technology but does not seek to solve similar problems.

US2015/0242865 (Richards/iHeartMedia) discloses a similar area of technology but does not seek to solve similar problems.

Us208/0300967 (Buckley) discloses a similar area of technology but does not seek to solve similar problems.

US2016/0134429 (Shimada/Fuji Xerox) discloses a similar area of technology but does not seek to solve similar problems.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly in one broad form of the present invention, there is provided a method of communicating survey questions to a list of participants; the list of participants obtained by including a proxy email address as a participant address in a list of participant email addresses whereby a web enabled server receiving an invitation addressed to the proxy email address also receives the list of participant email addresses; the web enabled server subsequently transmitting survey questions to the participants identified by the list of participant email addresses.

Preferably, the proxy email address is a meeting type email address.

Preferably, the web enabled server responds with an acceptance to the invitation.

Preferably, the web enabled server further provides a link to associate a recurring set of meetings with other recurring sets of meetings; and wherein the recurring set of meetings are associated as one or more of recurring meetings within a recurring series of meetings.

Accordingly in yet another broad form of the present invention, there is also provided a meeting quality assessment system; said system comprising at least one web enabled server in communication with a plurality of digital communication devices; the web enabled server incorporating a processor and a memory; the processor executing instructions stored in the memory and as modified by data contained in the memory; the processor executing at least following steps:

receiving meeting invitations from a meeting organizer with reference to all participant email addresses;

the meeting invitation including a predetermined meeting time; the predetermined meeting time comprising a meeting start time and a meeting end time;

each meeting invitation also addressed to at least one meeting type email address;

the meeting type email address includes a meeting type descriptor;

the web enabled server responds with an acceptance to each meeting invitation;

the web enabled server further provides a link to associate a recurring set of meetings with other recurring sets of meetings; and wherein the recurring set of meetings are associated as one or more of recurring meetings within a recurring series of meetings;

the meeting type descriptor input as an argument to a question generating function on the web enabled server;

in a separate step survey questions are communicated to each prospective participant at the predetermined meeting time on a digital communication device of each prospective participant;
the questions being a function of the meeting type descriptor;
each digital communication device generating participant response data from answer data entered into the digital communication device with reference to each question by each participant;
on completion of the survey questions by each participant response data is transmitted from each digital communication device to the web enabled server;
the web enabled server collates the participant response data and after a predetermined collation time transmits assessment data to each digital communication device.

Preferably, the assessment data comprises a score.

Preferably, the assessment data is parsed to provide a meeting tone value.

Preferably, the step of communicating survey questions further includes the step of providing the questions from an earlier meeting prepopulated with the answers provided to those questions from the previous meeting.

Preferably, the step of communicating survey questions further includes the step of providing the questions for each respective participant and only those questions answered by that respective participant from an earlier meeting prepopulated with the answers provided to those questions by that participant from the previous meeting.

Preferably, the step further includes prepopulating a most likely answer for each participant using artificial intelligence from stored data or from publicly available data on the internet to calculate using artificial intelligence.

Preferably, the step of communicating survey questions further includes the step of providing a subset of one or more inputs.

Preferably, the inputs are in the form of questions, a set of multi choice, radio button or check box like hyperlinks.

Preferably, each hyperlink is unique and corresponds to a complete answer.

Preferably, the hyperlink contains the selective value of the individual choice, answers previously supplied either from smartphone or when the hyperlink has been previously used.

Preferably, if not previously scored then the default value is used.

Preferably, the hyperlink also contains an identifier for the user that is unique to this meeting.

Preferably, in addition each hyperlink contains a unique one-time password.

Preferably, if it is detected that the hyperlink has been tampered with, then the server silently disconnects and nothing is shown in the users browser.

Preferably, tampering with the hyperlink is determined by determining if the content of the hyperlink has changed.

Preferably, selecting on the hyperlink updates the database with the explicit selection and the implicit selections contained within the link.

Preferably, the web enabled server communicates an invitation to a prospective participant to a digital communication device operated by the prospective participant.

Preferably, the predetermined collation time is 24 hours.

Preferably, the predetermined collation time is zero.

Preferably, the assessment data includes a score value.

Preferably, the assessment data includes a graphical comparison between and within a recurring series of meetings.

Preferably, the questions are presented in an email.

Preferably, the questions are presented in a browser window by execution of a browser application accessed by a link in an email.

Preferably, the questions are presented on a smart phone platform as a display application executing on the digital communication device.

Preferably, the digital communication device is a hand held digital communication device.

Preferably, the digital communication device is a smartphone.

Preferably, the system analyses and assesses the assessment data from multiple users across multiple meetings thereby to report globalized results.

Preferably, the system applied in the context of recurring meetings which will occur for a particular endeavour and where there will also be associated recurring meetings.

Preferably, a project has recurring project team meetings, recurring steering committee meetings, recurring stakeholder meetings, recurring backlog meetings, recurring demonstration meetings, recurring retrospective meetings, recurring risk meetings, recurring program meetings and recurring portfolio meetings and recurring Customer Acquisition meetings.

Preferably, the survey system compares meetings from the same recurring set but for the set of all meetings for the endeavour.

Preferably, the above described survey system operates according to the above described method.

In yet another broad form of the present invention, there is also provided a method of assembling programme code for execution on a platform; said method comprises:
defining a first lookup table which maps specified parameters against specified patterns;
defining at least one macro portion which is a function of a parameter and of a platform;
transmitting the at least one selected specified macro portion specified by a parameter in the first lookup table as a function of the platform;
installing the at least one selected specified macro portion in an application on the platform;
executing the at least one selected specified macro portion on the platform.

Preferably, the macro portions include merge portion links; each merge portion link linking to code which is a function of a parameter.

Preferably, a user may define a new parameter in the first lookup table.

Preferably, the new parameter is defined with the assistance of a portal executing on the web enabled server.

Preferably, the portal issues a macro portion to the platform in response to execution/invoking of a "new parameter" parameter in the macro mapping table.

Preferably, the parameter which the user may define is a new meeting type identified by a new meeting type email address in the macro mapping table.

Preferably, the system can generate new parameter.

Preferably, the new parameter is generated in response to a user invoking execution of a parameter.

Preferably, the new parameter is a meeting type.

Preferably, the new parameter causes reports in the form of a summary of responses to multiple meetings which can be recurring.

Preferably, the parameter is in the form of a meeting type descriptor.

Preferably, the first lookup table is a macro mapping table.

Preferably, a specified parameter includes a meeting type email address.

Preferably, a specified parameter includes a question element.

Preferably, a specified parameter includes a response element.

Preferably, transmission is a function of meeting participant email address.

Preferably, the above described method of assembling programme code operates in conjunction with the method of communicating survey questions as described above.

In yet another broad form of the present invention, there is also provided a system for assembling macro portions of code portions to enable execution of the granular generation and dissemination of questionnaire forms, results forms and resulting report forms; the system comprises at least a first lookup table stored in memory on a web enabled server and wherein the system:

defines a first lookup table which maps specified parameters against specified patterns;

defines macro portions which are a function of a parameter and of a platform;

transmits a selected specified macro portion specified in the first lookup table to a platform;

installs the macro portion in an application on the platform;

executes the macro portion on the platform.

Preferably, the platform is an email platform.

Preferably, the platform is a browser platform.

Preferably, the platform is a smart phone platform.

Preferably, the application is a browser.

Preferably, the application is an application executable on a smartphone.

Preferably, the application is an email application executable on a digital device.

Preferably, media containing code which, when executed on a platform, gives effect to the system as described above.

Preferably, media containing code which, when executed on a platform, gives effect to the method as described above.

Preferably, authorised users are granted the right to schedule reports on aggregated meetings from specific customers.

Preferably, the reports may take the form of standard reports such as program or sales review reports or developed by users themselves using functionality.

Preferably, surveys and results are delivered in a specified language generated by a translation engine.

Preferably, the email address is modified to include the two letter country code of the specified language.

Preferably, the system further including a portal which provides a facility for additional communication to be added to a communication made by the system.

Preferably, the additional communication takes form of the communication being phrased differently to suit determined traits.

Preferably, each additional communication is phrased differently to suit the determined traits from a grouping of four traits.

Preferably, each additional communication is comprised of sub-portions and wherein proportions of the sub-portions for each trait are apportioned according to the proportion of each trait of the receiver.

Preferably, a group of people can be selected as the attendees of a meeting or any of the aggregated meeting types eg program or partner customer or pulse and wherein an additional communication will be added to any Communication that is to be sent by MeetingQuality within the specified timeframe.

Preferably, the system for assembling macro portions described above operates in conjunction with the meeting quality assessment system described above.

Accordingly, in yet another broad form of the invention, there is provided a method of communicating survey questions to a list of participants; the list of participants obtained by including a proxy email address as a participant address in a list of participant email addresses whereby a web enabled server receiving an invitation addressed to the proxy email address also receives the list of participant email addresses; the web enabled server subsequently transmitting survey questions to the participants identified by the list of participant email addresses.

Preferably the proxy email address is a meeting type email address.

In a further broad form of the invention there is provided a meeting quality assessment system; said system comprising at least one web enabled server in communication with a plurality of digital communication devices; the web enabled server incorporating a processor and a memory; the processor executing instructions stored in the memory and as modified by data contained in the memory; the processor executing at least following steps:

a) Receiving meeting invitations from a meeting organizer with reference to all participant email addresses;

b) The meeting invitation including a predetermined meeting time;

c) Each meeting invitation also addressed to at least one meeting type email address;

d) The meeting type email address includes a meeting type descriptor;

e) The meeting type descriptor input as an argument to a question generating function on the web enabled server;

f) In a separate step survey questions are communicated to each prospective participant at the predetermined meeting time on a digital communication device of each prospective participant; the questions being a function of the meeting type descriptor;

g) Each digital communication device generating participant response data from answer data entered into the digital communication device with reference to each question by each participant;

h) On completion of the survey questions by each participant response data is transmitted from each digital communication device to the web enabled server;

i) The web enabled server collates the participant response data and after a predetermined collation time transmits assessment data to each digital communication device.

Preferably the assessment data comprises a score.

Preferably the assessment data is parsed to provide a meeting tone value.

Preferably the step of communicating survey questions further includes the step of providing the questions from an earlier meeting prepopulated with the answers provided to those questions from the previous meeting.

Preferably the step of communicating survey questions further includes the step of providing the questions for each respective participant and only those questions answered by that respective participant from an earlier meeting prepopulated with the answers provided to those questions by that participant from the previous meeting.

Preferably the web enabled server communicates an invitation to a prospective participant to a digital communication device operated by the prospective participant.

Preferably the predetermined collation time is 24 hours.

Preferably the predetermined collation time is zero.

The system of claim 1 wherein the assessment data includes a score value.

Preferably the assessment data includes a graphical comparison between and within a recurring series of meetings.

Preferably the questions are presented in an email.

Preferably the questions are presented in a browser window by execution of a browser application accessed by a link in an email.

Preferably the questions are presented on a smart phone platform as a display application executing on the digital communication device.

Preferably the digital communication device is a hand held digital communication device.

Preferably the digital communication device is a smartphone.

Preferably the system analyses and assesses the assessment data from multiple users across multiple meetings thereby to report globalized results.

Preferably the system is applied in the context of recurring meetings which will occur for a particular endeavour and where there will also be associated recurring meetings.

Preferably, a project has recurring project team meetings, recurring steering committee meetings, recurring stakeholder meetings, recurring backlog meetings, recurring demonstration meetings, recurring retrospective meetings, recurring risk meetings, recurring program meetings and recurring portfolio meetings and recurring Customer Acquisition meetings.

Preferably the survey system compares meetings from the same recurring set but for the set of all meetings for the endeavour.

In yet a further broad form of the invention there is provided a method of assembling programme code for execution on a platform; said method comprising
defining a first lookup table which maps specified parameters against specified patterns;
defining macro portions which are a function of a parameter and of a platform;
transmitting at least one selected specified macro portion specified in the first lookup table as a function of desired platform specified;
installing the at least one selected specified macro portion in an application on the platform;
executing the at least one selected specified macro portion on the platform.

Preferably the macro portions include merge portion links; each merge portion link linking to code which is a function of a parameter.

Preferably a user may define a new parameter in the first lookup table.

Preferably the new parameter is defined with the assistance of a structured environment executing on the web enabled server.

Preferably the structured environment issues a macro portion to the platform in response to execution/invoking of a "new parameter" parameter in the macro mapping table.

Preferably the parameter which the user may define is a new meeting type identified by a new meeting type email address in the macro mapping table.

Preferably the system can generate a new parameter.

Preferably the new parameter is generated in response to a user invoking execution of a parameter.

Preferably the new parameter is a meeting type.

Preferably the new parameter causes reports in the form of a summary of responses to multiple meetings which can be recurring.

Preferably the parameter is in the form of a meeting type descriptor.

Preferably the first lookup table is a macro mapping table.

Preferably a specified parameter includes a meeting type email address.

Preferably a specified parameter includes a question element.

Preferably a specified parameter includes a response element.

Preferably transmission is a function of meeting participant email address.

In yet a further broad form of the invention there is provided a system for assembling macro portions of code portions to enable execution of the granular generation and dissemination of questionnaire forms, results forms and report forms; the system comprising at least a first lookup table stored in memory on a web enabled server and wherein the system:
defines a first lookup table which maps specified parameters against specified patterns;
defines macro portions which are a function of a parameter and of a platform;
transmits a selected specified macro portion specified in the first lookup table e to a platform;
installs the macro portion in an application on the platform;
executes the macro portion on the platform.

Preferably the platform is an email platform.

Preferably the platform is a browser platform.

Preferably the platform is a smart phone platform.

Preferably the application is a browser.

Preferably the application is an application executable on a smartphone.

Preferably the application is an email application executable on a digital device.

Media containing code which, when executed on a platform, gives effect to the system as described above.

Media containing code which, when executed on a platform, gives effect to the method as described above.

In a preferred form the portal provides a facility for additional communication to be added to meeting results. A group of people can be selected as the attendees of a meeting or any of the aggregated meeting types eg program or partner customer or pulse. The communication will be added to any Communication that is to be sent by MeetingQuality within the specified timeframe. If no communications are sent during this time optionally a message can be sent anyway. The communication can be split into four different Messages. For instance the same message could be written four different ways to appeal to a strategic thinker, a tactical person, a relationship based person or a task based person. The four separate messages can be manually loaded or suggestions provided by artificial intelligence can be used. MeetingQuality will send the communication most likely to resonate with the receiver. That is send the strategic communication to the strategic thinker and technical communication to the tactical thinker etc. without the author of the message being aware of the profile of each individual receiver. MeetingQuality is able to determine the profile of each individual through a combination of external social media posts and tweets and internal results provided for and about an individual.

BRIEF DESCRIPTION OF DRAWINGS

Embodiments of the present invention will now be described with reference to the accompanying drawings wherein:

FIG. 2 is an email structure containing survey questions and a link to a questionnaire containing the survey questions in accordance with a reference implementation.

FIG. 3B illustrates the graphical assessment data of FIG. 3A.

FIG. 6 represents assessment data in a first form generated by the system of the first embodiment.

FIG. 7 represents assessment data in a second form generated by the system of the first embodiment.

FIG. 8AA is a diagram of a method for measuring traits of receivers/participants/attendees, generating the additional communications based on the traits.

In one particular form the invitations are sent by the meeting organizer. The invitations may be sent through server 221. In an alternative form they may be sent via an independent server system. 236 independent of server 221 but under the control of the meeting organizer.

Figure 9A:
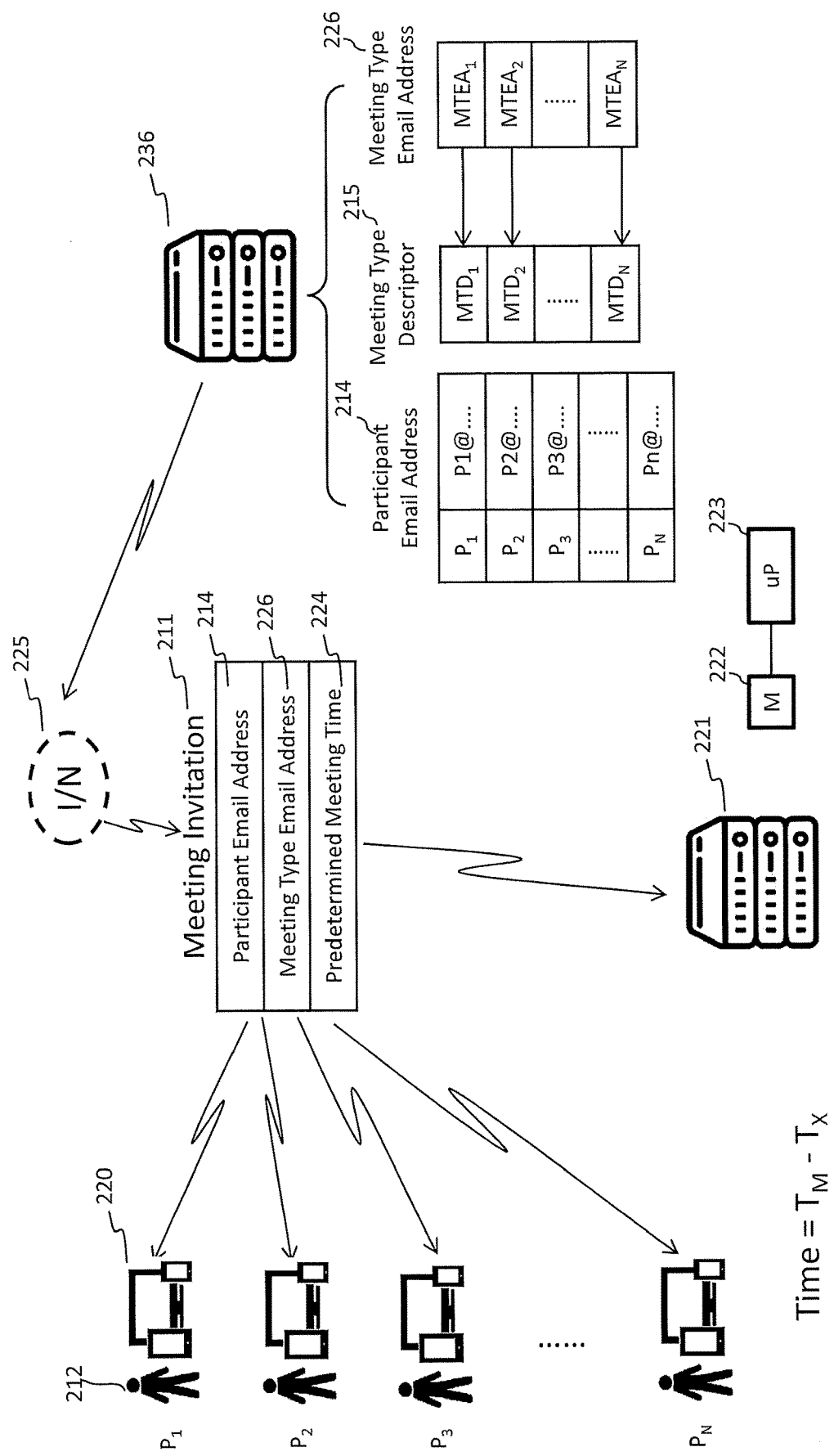
FIG. 9A is a schematic diagram of the components of the system of the second embodiment at a first time of operation of the system where invitations are communicated.
Figure 9A:
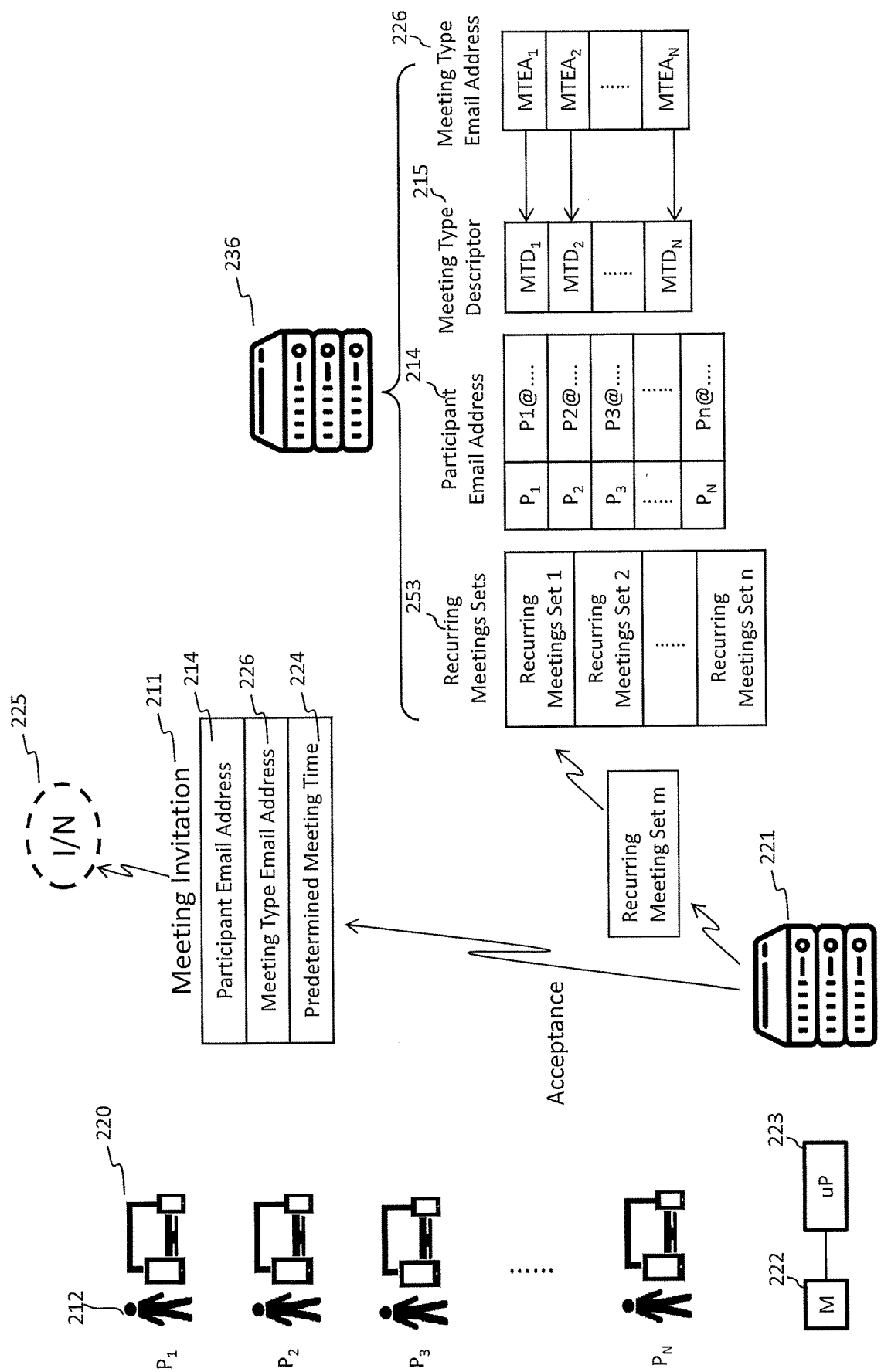

FIG. 9AA is a schematic diagram of the components of the system of the second embodiment wherein in a preferred form the web enabled server 221 responds with an acceptance to the meeting and provides a link to associate a recurring set of meetings with other recurring sets of meetings 253 as though they were included as one or more of this meetings recurring meetings.

FIG. 9AAA is a schematic diagram of the components of the system of the second embodiment showing the link back to the server to associate other meetings with the recurring set of meetings of FIG. 9AA.

FIG. 9AAAA is a flowchart of the components of the system of the second embodiment showing use of the link back to the server to associate other meetings with the recurring set of meetings of FIG. 9AA.

FIG. 9B is a schematic diagram of the components of the system of the second embodiment at a second time of operation of the system where prospective participants communicate acceptance of the invitations to the organizer.

FIG. 9C is a schematic diagram of the components of the system of the second embodiment at a third time of operation of the system where survey questions are sent to those participants which communicated acceptance. The send operation may be triggered on the web enabled server 221 by time—that is when time reaches or equals the predetermined meeting time specified in the invitations 11.

FIG. 9CC is a diagram of providing feedback which may be either explicit or implicit.

In this arrangement server 221 does not know who has accepted. The server 221 sends emails to whoever was on the meeting invitation 11 sent by the organizer by way of server 236. In one form the meeting organizer may remove the people who have not accepted and reissue the invitation 11. The server 221 provides the opportunity to mark someone as absent so they are not scored.

Figure 9D:
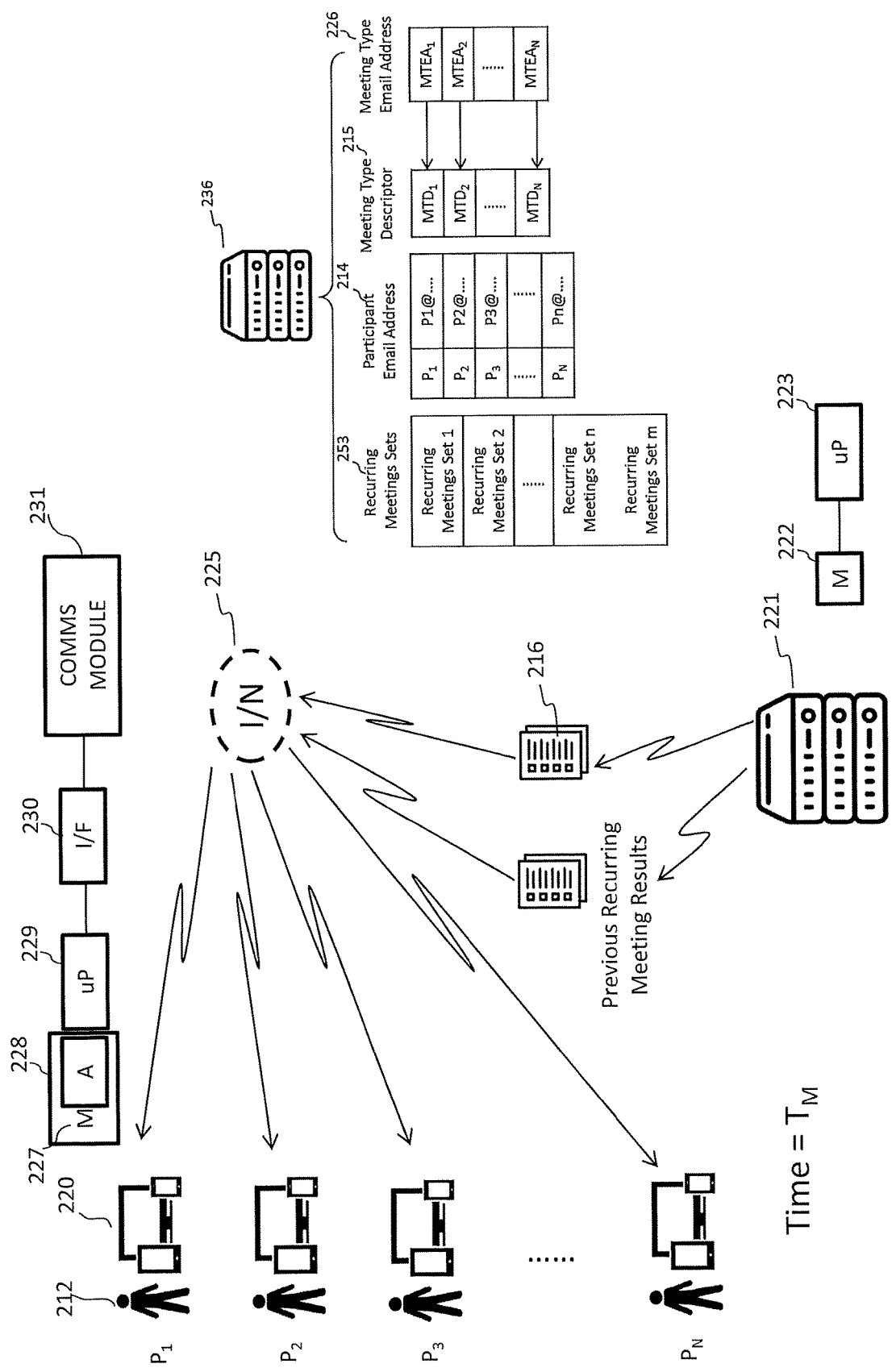

FIG. 9D is a schematic diagram of an alternative pre-population mode of operation of FIG. 9C at the third time of operation of the system.

Figure 9E:
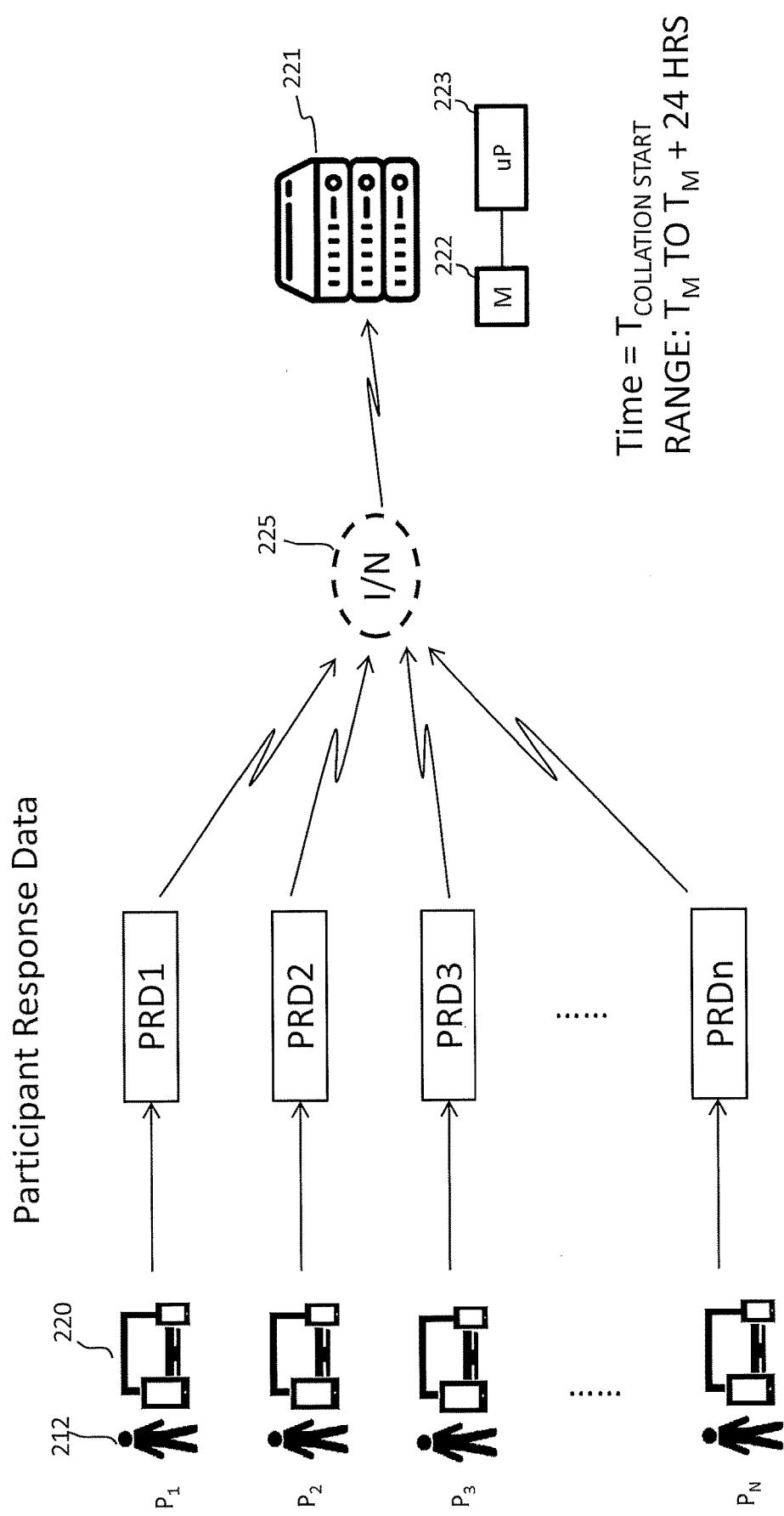

FIG. 9E is a schematic diagram of the components of the system of the second embodiment at a fourth time of operation of the system where participants communicate response data to server 221.

Figure 9F:
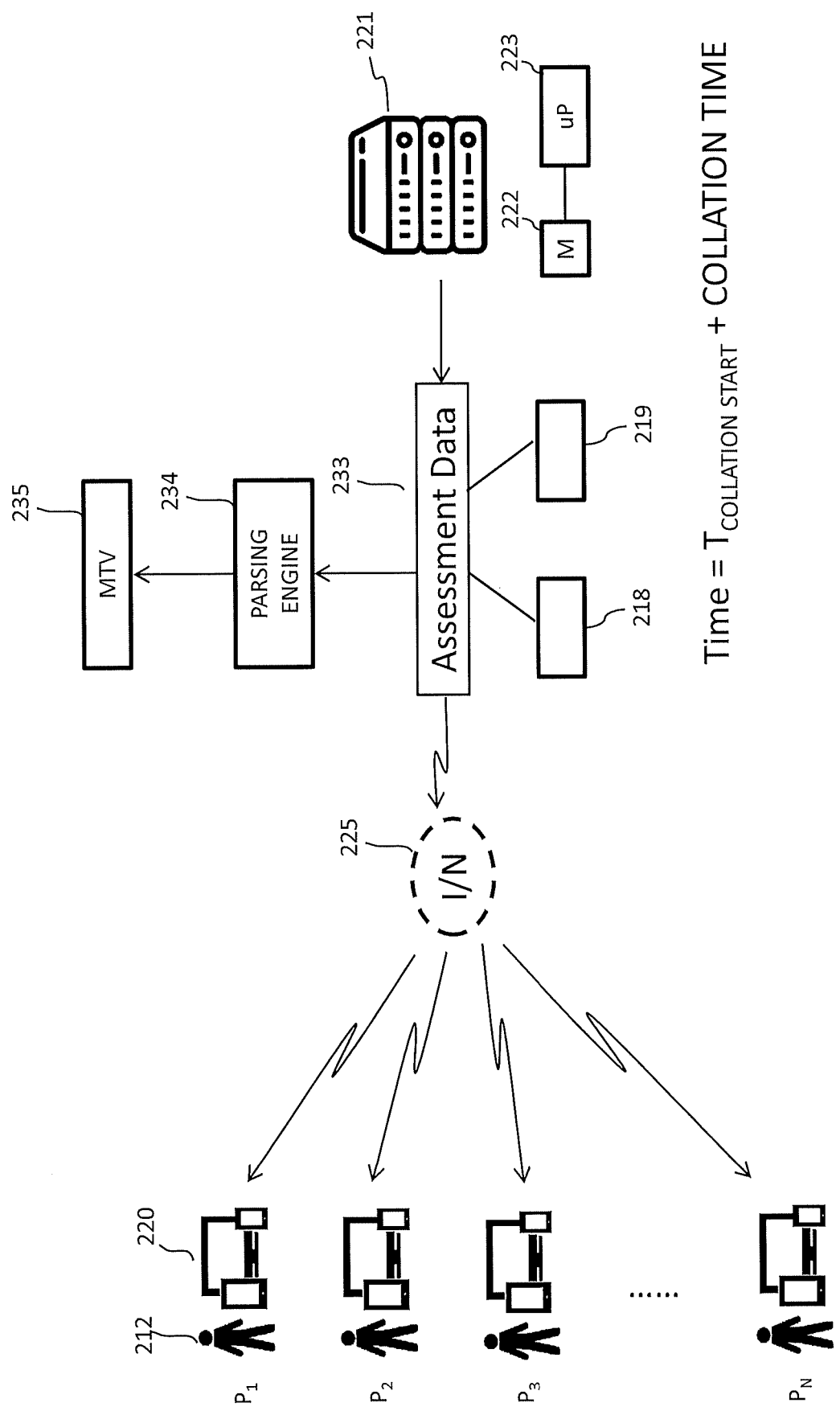

FIG. 9F is a schematic diagram of the components of the system of the second embodiment at a fifth time of operation of the system where the system transmits assessment data 233 from server 221 to the participants.

FIG. 10 is a portion of a macro mapping table 240 which forms the basis for a method of specifying and assembling macro portions such as macro portion 241 to execute either questionnaires 16 or results reports 18 as a function of meeting type descriptor 15 and/or platform 242, 243, 244.

FIG. 11 shows a portion of the questions html macro portion 241 for the email platform 242 for the meeting type descriptor 15 in this instance measure which is implemented by email address 14 as measure@meetingquality.com. From FIG. 10 measure can be seen to be pattern 0.

FIG. 12 is a portion of the macro portion 241 which shows the questions html macro portion 241 for the web page platform 243 for pattern 0.

FIG. 13 shows a portion of the questions html macro portion 241 for the smartphone platform 244 for pattern 0.

FIG. 14 shows a portion of the results html macro portion 241 for the email platform 242 for pattern 0.

FIG. 15 shows a portion of the results html macro portion 241 for the web platform 243 for pattern 0.

FIG. 16 shows a portion of the results macro portion 241 for the smartphone platform 244 for pattern 0.

Figure 17:
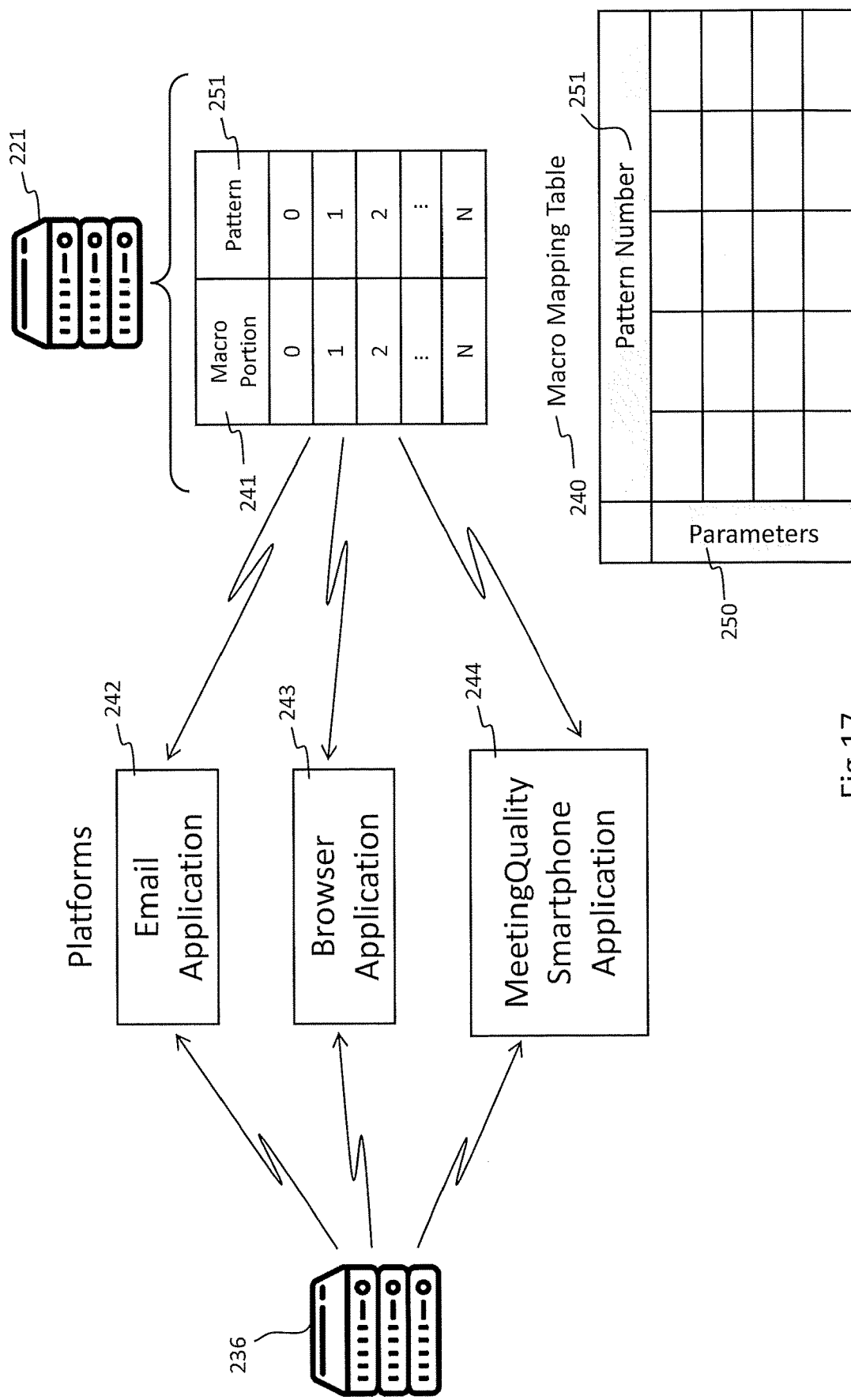

FIG. 17 is a schematic diagram illustrating the table driven methodology which forms the basis for a method of specifying and assembling macro portions such as macro portion 241 to execute either questionnaires 16 or results reports 18 as a function of meeting type descriptor 15 and/or platform 242, 243, 244.

Figure 18:
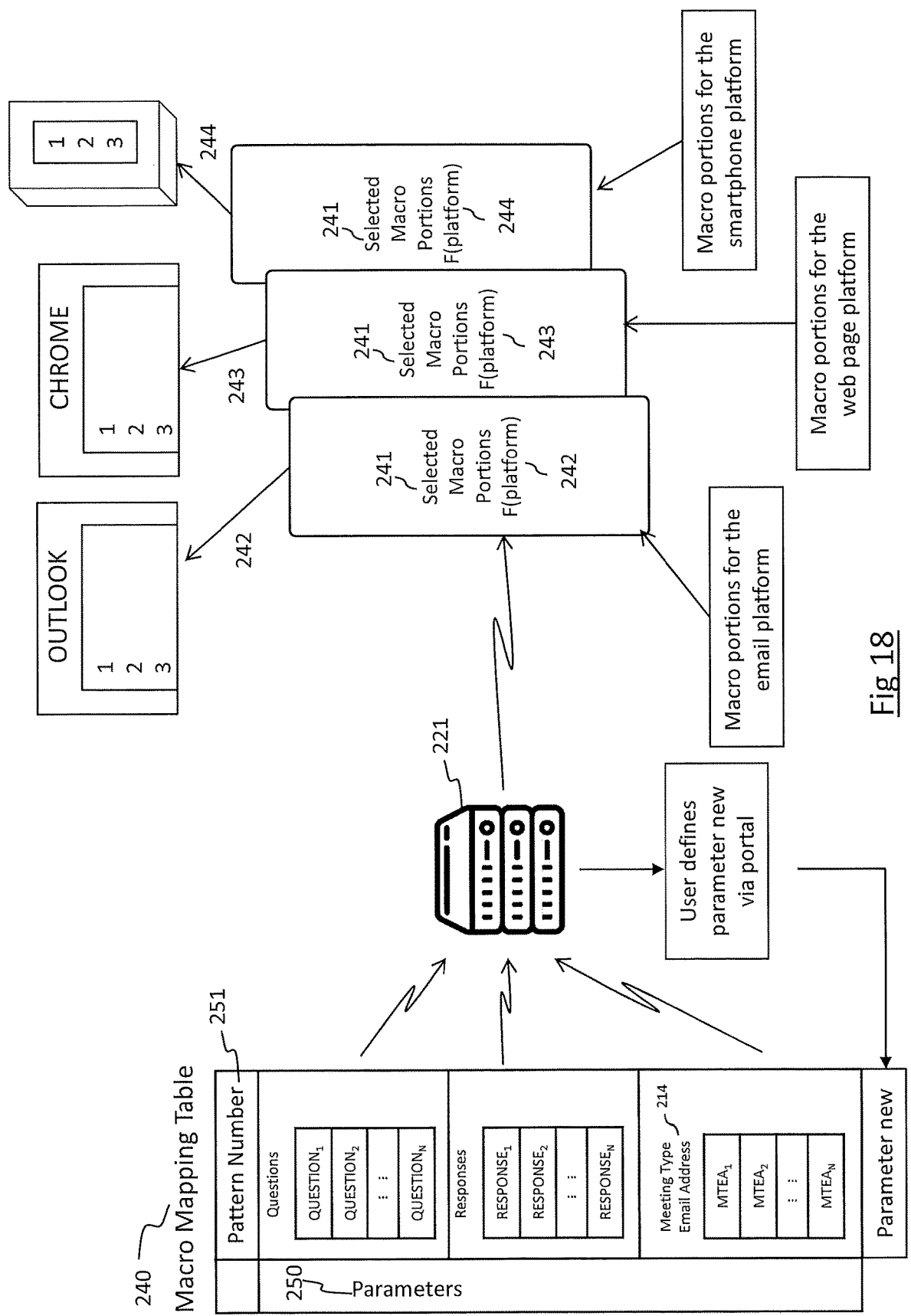

FIG. 18 is a schematic diagram illustrating servicing of multiple platforms.

DESCRIPTION OF EMBODIMENTS

Figure 1:
FIG. 1 is a meeting invitation in accordance with a reference implementation.
Figure 3A:
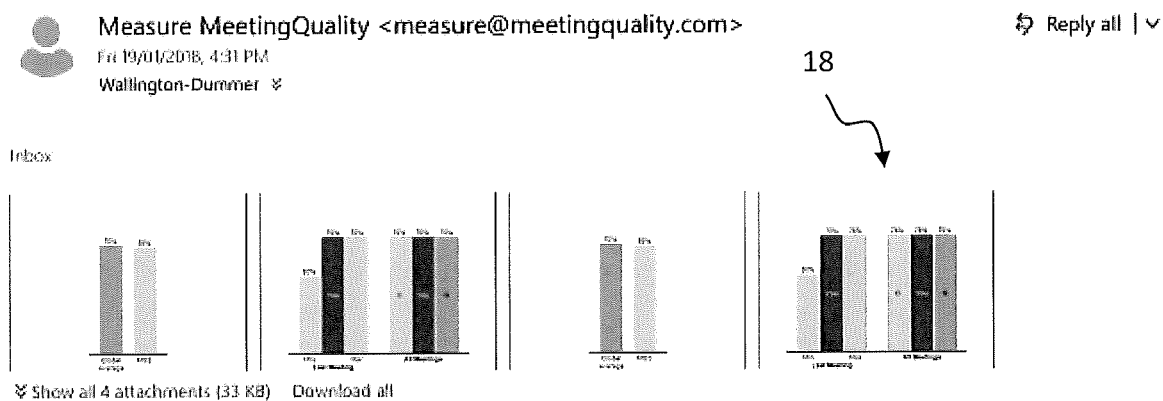
FIG. 3A is an email structure containing assessment data for each participant in accordance with a reference implementation.

With reference to FIGS. 1, 2 and 3 there is illustrated steps in a reference implementation of a meeting survey system.

First Preferred Embodiment

FIGS. 4, 5, 6 and 7 illustrate the steps in an enhanced implementation of the reference implementation according to a first preferred embodiment of a meeting survey system 10.

With reference to FIG. 1 a mail server (not shown) causes an invitation 11 to be sent to each meeting participant 12. One of the participants is a pseudo participant 13 comprising an email address 14 signifying a meeting type descriptor 15.

With reference to FIG. 2 a questionnaire 16 is then emailed by the server to each participant and wherein the questions 17 of the questionnaire are tailored to the meeting type signified by the meeting type descriptor 15.

With reference to FIG. 3 once the participants 12 have answered the questions 17 in the questionnaire 16 and sent the answers back a report 18 is emailed to each participant 12. The report 18 may include a numerical assessment of the meeting quality as assessed by the system 10 based on the answers to the questions provided by each participant. In one form the score 19 is a Meeting Promoter Score (MPS) 19A which is calculated as a function of the assessed contribution of each participant 12. In a further form the score 19 is a Meeting Quality Score 19B which is calculated as a function of the totality of the contribution by all participants 12. The report 18 may also include graphical representations of an assessment of the meeting quality for example with reference to figures of merit derived from a database of many such meetings.

First Preferred Embodiment

Figure 4:
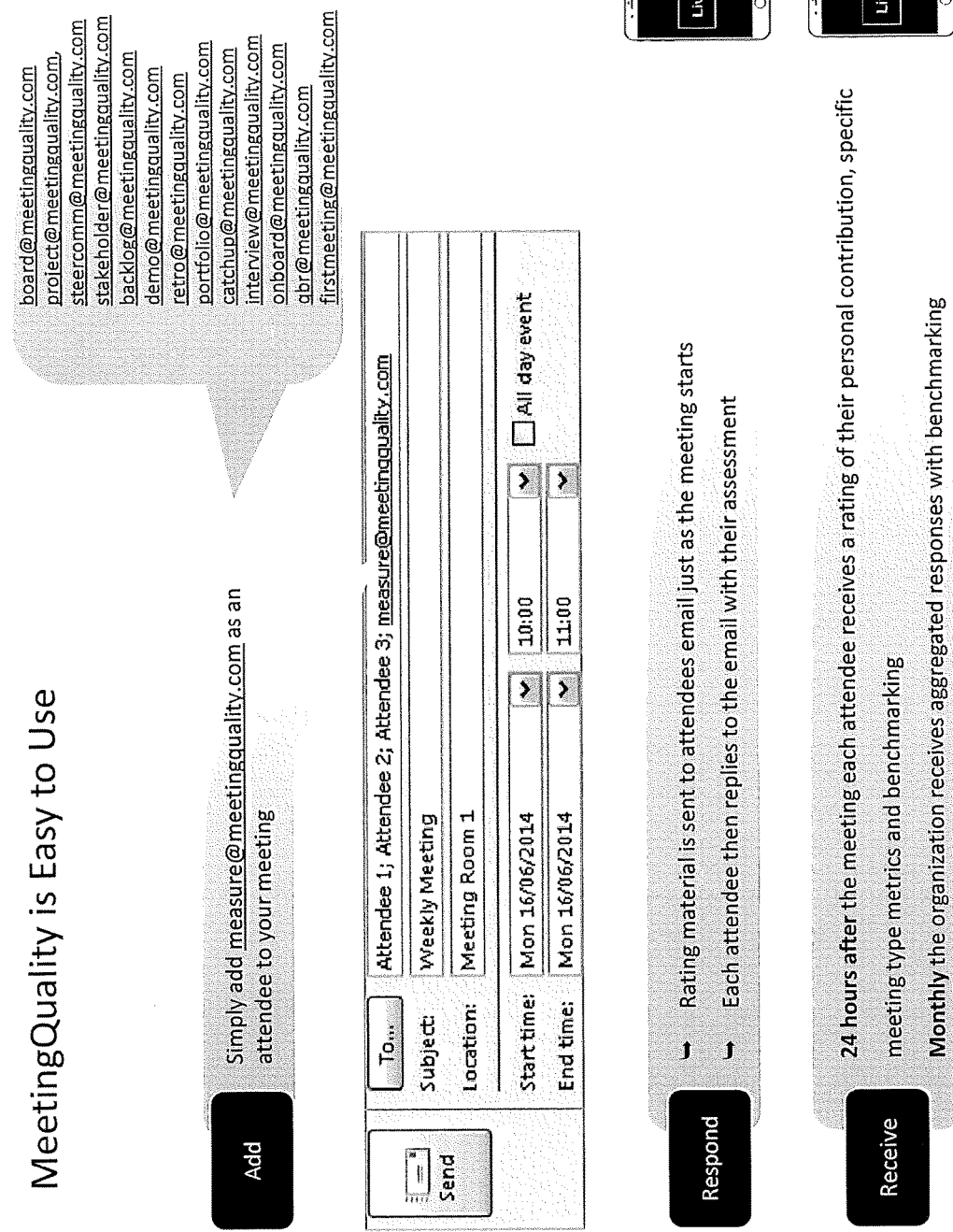
FIG. 4 is a flowchart representing steps in an enhanced system according to a first embodiment.

With reference to FIGS. 4, 5, 6 and 7 the enhanced implementation in accordance with a first preferred embodiment operates as follows:

With reference to FIG. 4:

Each of the system 10 products expect different email addresses to be invited to the meeting. For instance for general meetings the system 10 expects the email address measure@meetingquality.com to be invited to the meeting and for Steering Committee meetings the system 10 expects steercomm@meetingquality.com to be invited to the meeting.

In use, in this embodiment, everybody receives an email with rating questions just as the meeting starts. The email is very fast to complete as it only requires the attendee to reply to the email and fill out the appropriate sections. This may be a heavily text based email so that it will work in all email clients. eg gmail, hotmail, Lotus Notes, Outlook and Apple Mail. The attendee has 23 hours and 59 minutes to fill out the rating email because 24 hours after the meeting is completed the results email is sent individually and confidentially to each attendee. Note even if an attendee does not fill out the rating email they will have been rated by other attendees and therefore receive a results email.

SmartPhone users can view the rating questions and results as soon as the calendar invite is accepted by the system 10. The SmartPhone version is useful for swarming applications. For instance for portfolio meetings where risk and value of each project is evaluated multiple real time evaluations has resulted in better categorisation of projects.

Note that receiving a low MPS score can be quite confronting. We take our duty of care very seriously and have a number of safeguards in place to ensure that the system 10 is being used in an appropriate and professional manner. In addition we recommend working with one of our implementation partners to ensure that the best possible environment is created when implementing the system 10.

Figure 5:
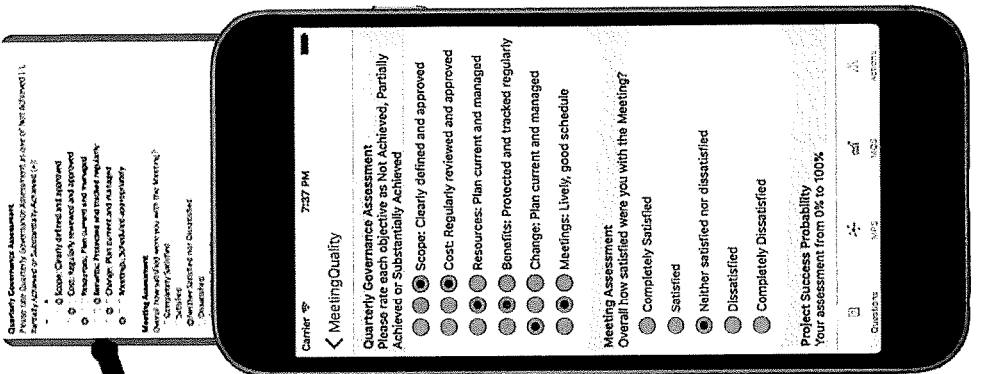
FIG. 5 illustrates survey questions for representation in email form and in a display application executing on a digital communicating device in accordance with a first embodiment.

With Reference to FIG. 5:

The system 10 sends a rating email just as the meeting starts. The system 10 is unusual as it only requires the attendee to reply to the email and replace a small number of characters. For example all questions to be answered by a Steering Committee member are shown in FIG. 5—only the introduction and closing paragraph have been omitted. Questions can also be answered by clicking on the link to the web site and similarly the same questions can be answered from the SmartPhone. In another preferred embodiment, a Steering Committee member clicks on the link to get access to live results and updates of the questions and answers through the web site.

In this instance every fourth meeting the governance level of the project is assessed. It is suggested that a score of Substantially Achieved should only be given if documented evidence is provided to the steering committee and there has been meaningful discussion on the subject by the Steering Committee.

All Steering Committee members Project Success Probability scores will be averaged and placed in the portfolio report. The portfolio report will compare the average Project Success Probability scores from the Project Team, Steering Committee, Stakeholders, backlog, demonstration, retrospective, risk, program and portfolio meetings.

Each attendee is listed and their contribution is assessed by each rater. The system 10 encourages recurring meetings so that some of the quieter attendees who provide work between meetings, prepare thoroughly and complete their action items on time should be rated as providing a very positive contribution.

Feedback should be used to provide comment on the meeting which will be sent to each attendee as part of the results email 24 hours after the meeting finishes.

With Reference to FIG. 6:

The graphs shown here in the form of assessment data are emailed individually and confidentially to each attendee 24 hours after the meeting finishes whether or not they have returned the rating materials.

The Meeting Promoter Score is similar to a 360 degree review. A score of 0 means that every rating the system 10 received, rated the individual as providing a negative contribution to the meeting. A score of 100 means that every rating that the system 10 received, rated the individual as providing a very positive contribution to the meeting. Numbers between 0 and 100 are proportional to the number of positive contribution scores and very negative contribution scores.

The left hand graph shows the attendee's Meeting Promoter Score (MPS) for the last meeting and compares their score with the Individual with the lowest Meeting Promoter Score and the individual with the highest Meeting Promoter Score. This particular attendee at the last meeting had an MPS of 88%, which is between the team member who had the lowest score of 50% and the team member who had the highest score of 100%. Also shown on the left hand graph is the attendees Meeting Promoter Score over all meetings. This particular person has a very healthy MPS of 82% over all meetings, higher than the all meeting average of their colleagues from Company X of 45% and higher than the global average of 74%.

Given that the all meeting MPS of this person is 82% and their company aggregate MPS is 45% this person should probably leave their existing company!

Column A is very important because in essence this provides the aggregate MPS of the entire organisation that this person works for every 24 hours. It is our contention that the MPS aggregate score for an organisation is better suited to a service industry than the traditional Net Promoter Score. In addition the MPS can be calculated daily for any subset of attendees. For instance a separate calculation could be just for the MPS of customers results only for the individuals within a particular organisation.

The grey line marked AA in the right hand graph is the score for the quality of the meeting. The Quality of the meeting is calculated using the system 10 algorithm which takes into account the attendee assessment, the reason why people are at the meeting and the overall contribution of every attendee based on their MPS. The line marked BB is the Project Success Probability as assessed by the meeting attendees. This graph may be produced for the second and subsequent recurring meetings when there is sufficient data to graph. Information may be inferred from the trend lines AA and BB. Information may be inferred from each line individually. Information may also be inferred by a comparison of the trend lines AA against BB. In one particular form the behavior whereby both trend lines AA and BB trending down and also trending away from each other may indicate a negative inference in relation to the project the subject of the meetings.

The system 10 is best suited to recurring meetings as it provides the feedback loop to improve meeting performance. It should be reserved for important meetings and should be used a maximum of 3 to 4 times a week for each individual.

With Reference to FIG. 7:

Every project which has ratings from a Steering Committee, Project Team, Stakeholder meeting, backlog, demonstration, retrospective, risk, program or portfolio meetings is amalgamated into a portfolio report. The upper table shown here contains the Meeting Quality Score (MQS) and the Project Success Probability for three projects imaginatively named Project A, Project B and Project C. The lower table contains the answers to the Quarterly governance assessment filled out only by the Steering Committee.

The Project A Steering Committee last meeting was a good quality meeting (MQS 68%) and has a high Project Success Probability of 75%. The project team for Project A is not so sure. In spite of having a good project meeting (MQS 72%) the team is only predicting a Project Success Probability of 56%. It is quite normal for the project team to project problems before the Steering Committee and Stakeholders. Interestingly Project A Governance results gave a clue to some of the potential problems. Note that the Resources score of 55% and warnings of Scope and Change may be the reason for the pessimism of the project team.

Project B is the classic profile of the watermelon project. Green on the outside but red on the inside. The Meeting Quality Score of 35% for the project team meeting suggest serious disfunction and may be the cause of their very low 40% Project Success Probability score. The stakeholder meetings are also not going well with a MQS score of 59% and a dismal Project Success Probability of 25%. Meantime the Steering Committee Project Success Probability is 80% !! This is the classic profile of information withheld from a Project Director or Sponsor which would explain why the MQS score for the Steering Committee was only 54%. Early signs of problems with this project could also be seen in the Portfolio Governance table with critical scores for Scope, Resources and the operation of the meeting itself. Note the Mtg score on the governance table is different to the MQS score from the table above.

Project C is the profile of a new project still in the honeymoon period.

Second Preferred Embodiment

Figure 8:
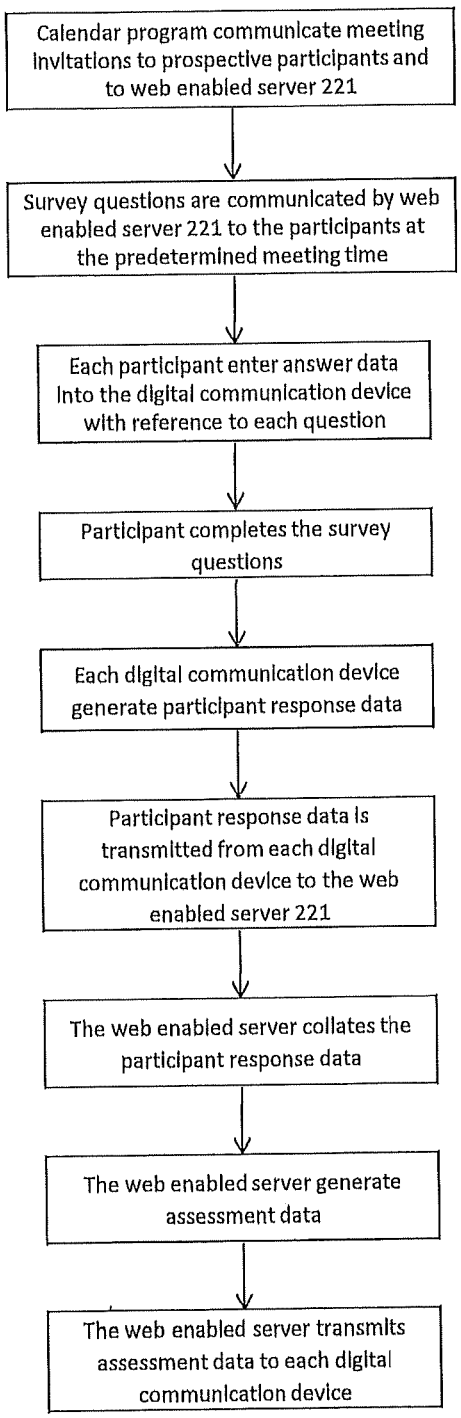
FIG. 8 is a flowchart of the operation of the system in accordance with a second embodiment.

With reference to FIGS. 8 and 9 there is illustrated a meeting survey system 210 in accordance with a second preferred embodiment wherein like components are numbered as for the earlier embodiments but in the 200s series.

FIG. 8 is a flowchart of the operation of the system 210 in accordance with a second embodiment;

FIG. 9A is a schematic diagram of the components of the system 210 of the second embodiment at a first time of operation of the system 210 where invitations 211 are communicated to each prospective meeting participant 212 in this instance designated P1, P2, P3 . . . Pn. In this preferred form each invitation 211 includes at least a participant email address 214, a meeting type email address 226 and a predetermined meeting time 224. In one form the meeting time may be a recurring meeting time.

In a preferred form the invitations 211 are communicated over the internet 225 from a mail server, for example but not limited to web enabled server 221 to the respective digital communications devices 220.

The invitation is also communicated to the meeting survey system 210, in this case to web enabled server 221.

In preferred form each participant utilizes a digital communications device 220 for the purpose of receiving the invitation 211 and otherwise participating in the meeting system 210 as will be further described below.

In this preferred form a server 221 includes at least a memory 222 in communication with a processor 223 programmed to act as a web enabled server. The server 221 retains in memory 222 a list of email addresses 214 designated respectively P1@ . . . , P2@ . . . corresponding to each prospective meeting participant P1, P2 as shown in the table in FIG. 9A. Also saved in memory 222 is a list of meeting type descriptors 215 designated MTD1, MTD2 . . . . In this instance each meeting type descriptor 215 has associated with it a corresponding meeting type email address 226 designated respectively MTEA1, MTEA2 . . . . Also stored in memory 222 is a respective questionnaire 216 designated Q1, Q2 . . . corresponding to each respective descriptor 215.

With reference to FIG. 9AA, in a preferred form the web enabled server 221 responds with an acceptance to the meeting and provides a link to associate a recurring set of meetings with other recurring sets of meetings 253 as though they were included as one or more of this meetings recurring meetings.

FIG. 9B is a schematic diagram of the components of the system of the second embodiment at a second time of operation of the system where prospective participants communicate acceptance (or not) of the invitations 211.

FIG. 9C is a schematic diagram of the components of the system of the second embodiment at a third time of operation of the system where survey questions are sent to those participants that were invited to the meeting as received by MQ server.

In an alternative form the questionnaires 216 may be downloaded from a web enabled server 221 by way of an application 227 loaded into memory 228 of digital communications device 220.

In preferred forms each digital communications device 220 comprises at least a memory 228 in communication with a processor 229 further in communication with an interface 230 and further in communication with a communications module 231.

In this instance the questionnaires 216 corresponds to the questionnaire for meeting type descriptor MTD2. The questionnaire 216 is sent to the participants comprising, in this instance, participants P1, P2 and Pn.

In an alternative particular form with reference to FIG. 9D pre-population functionality may be provided whereby the questionnaire 216 may have appended to it the answers provided by each prospective participant to the questionnaire corresponding to the previous instance of that recurring meeting. In an alternative form prepopulation may be effected for the first meeting of a recurring set, the most likely answer that the attendee will give based on previous answers and/or artificial intelligence.

With reference to FIG. 9C T=0 implies instantaneous or near real time feedback to the participants.

This is a particularly valuable feature allowing the possibility for modification of behaviour during the meeting to improve perceived outcome of the meeting before the end of the meeting.

With reference to FIG. 9C and FIG. 9CC, in an alternative form, the step of communicating survey questions further includes the step of providing a subset of the questions, possibly one, to be asked as a set of multi choice, radio button or check box like hyperlinks. Each hyperlink is unique and corresponds to a complete answer. The hyperlink contains the selected value of the individual choice (so called explicit selection). Alternatively, it may contain answers previously supplied. The answers may derive from digital device input such as smartphone or the answers may derive from when the hyperlink has been previously used (so called implicit selection). If not previously scored then the default value as described above is used. The hyperlink also contains an identifier for the user that is unique to this meeting. In addition each hyperlink contains a unique one-time password which is tamperproof. If the MeetingQuality server detects that the hyperlink has been tampered with, then the server silently disconnects and nothing is shown in the users browser. Selecting on the hyperlink updates the database with the explicit selection and the implicit selections contained within the hyperlink. The only exception to this is where the default values have been used but in the meantime the same user from another device has explicitly updated their answers, in which case the implicit values are ignored. The user is then presented the results and the opportunity to change or update any of their answers.

FIG. 9E is a schematic diagram of the components of the system of the second embodiment at a fourth time of operation of the system where participants communicate response data in the form of answers to each question 216 in the questionnaire relating to the meeting, in this instance the meeting corresponding to meeting type descriptor MTD2.

The participants may communicate the response data 232 to the server via a selection of platforms. In one form there are three platforms which permit response in one of three ways:
 a) Reply to email. Scroll down. Fill out answers in the spaces provided. Send email. The server 221 then reads the email and decodes the answers
 b) Click on the link in above email to internet page with the same server
 c) Use the smartphone these platforms are described in more detail with reference to FIGS. 10 to 17.

The web enabled server 221 then proceeds to collate the participant's response data 232 comprising responses PRD1, PRD2 . . . from time $T_{COLLATION\ START}$ thereby to produce meeting assessment data 233 for that meeting. In preferred forms $T_{COLLATION\ START}$ starts from the predetermined meeting time $T_M$ 224 through to 24 hours after the predetermined meeting time 224. In one form the predetermined meeting time 224 comprises a meeting start time and a meeting end time. In one particular form $T_{COLLATION\ START}$ starts from the meeting start time. In another particular form $T_{COLLATION\ START}$ starts from the meeting end time. Assessment data is then prepared and sent to the participants as described below in more detail with reference to FIG. 9F. In a particular form the assessment data is sent in an email. In a further particular form the results email is sent 24 hours after the meeting end time.

FIG. 9F is a schematic diagram of the components of the system of the second embodiment at a fifth time of operation of the system where the system transmits assessment data 233 to the participants 212. In one form the assessment data 233 is sent only to those participants which participated in the meeting, the subject of the meeting assessment data 233. In an alternative form assessments are sent to all participants.

The meeting assessment data 233 may include report 218 and further including score 219 as described earlier. In one form the score 219 is a Meeting Promoter Score 19A. In another form the score 219 is a Meeting Quality Score 19B.

In a particular form the meeting assessment data 233 is passed through a parsing engine 234 thereby to produce a meeting tone value 235.

The meeting tone value 235 may be categorized in different areas. One area may be an emotive area where the meeting tone value 235 takes, a value selected from anger, disgust, fear, joy, and sadness. A further area may be a language tone area where the meeting tone value 235 takes a value from analytical, confident, and tentative. A further area may be a social tone area (personality traits) where the meeting tone value 235 takes a value selected from openness, conscientiousness, extraversion, agreeableness, and emotional range.

In one form the parsing engine 234 is provided as a third party service—for example as currently it is provided by IBM Corporation by way of the Watson artificial intelligence engine.

Multiple Meetings

In particular forms the system analyses and assesses the assessment data from multiple users across multiple meetings thereby to report globalized results.

Globalized result reporting is particularly useful and applicable in the context of recurring meetings which will occur for a particular endeavour and where there will also be associated recurring meetings. For example, a project will have recurring project team meetings, recurring steering committee meetings and recurring stakeholder meetings.

Another form of endeavour comprises a Customer Acquisition meeting set which will have associated individual or recurring meetings comprising first meeting, customer, sales review, and sales portfolio.

The strength of the survey system of the present application is that, in some forms, it not only compares meetings from the same recurring set but for the set of all meetings for the endeavour.

The system 10 provides for granular generation and dissemination of questionnaire 16 and resulting report 18.

For projects and like endeavours: An organizer sends a meeting request to program@meetingquality.com. The system 10 sends back a list of project type meetings that are underway at that company, or a link to web site including the list of project type meetings. The organizer selects from the list. This automatically generates program reports based on the email address of the meeting. A similar process is used for portfolios except in this case the system 10 allows the organizer to select from a list of programs which they have made as just described.

For first meetings or other customer meetings and like endeavours (includes finplan etc): The organizer (usually a sales manager) invites their team plus salesreview@meetingquality.com to a meeting. The system 10 by way of server 221 then presents a report to everybody at the meeting (referenced against participant email address) based on the first meetings attended by each person at the meeting.

For interviews and like endeavours: The first word in the text is used to align meetings. For instance when an interviewer does not wish the candidate to know their email address the recruitment consultant will send two calendar invites to the same meeting. They will both have a job number as the first word in the summary which the system 10 searches on.

Granular and Selectable Generation

With reference to FIGS. 10 to 17 there is described a system and methodology for assembling macro portions to enable execution of the granular generation and dissemination of questionnaire 16 and resulting report 18 referenced above.

The macro portions allow the creation by the user of surveys and questions for the survey. The macro portions also allow the user to create customized reports from the responses to the survey. The macro portions enabled the creation of the communication drop feature referenced further in this specification.

Furthermore the macro functionality enables a highly responsive system where receivers/participants/attendees may receive survey results in real time or substantially real time on their preferred digital device.

The real time feedback permits the possibility of incorporating feedback from survey results into the meeting as it progresses.

FIG. 10 is a portion of a macro mapping table 240 which forms the basis for a method of specifying and assembling macro portions such as macro portion 241 to execute either questionnaires 16 or results reports 18 as a function of meeting type descriptor 15 and/or platform 242, 243, 244.

FIG. 11 shows a portion of the questions html macro portion 241 for the email platform 242 for the meeting type descriptor 215 in this instance "measure" which is implemented by email address 214 as measure@meetingquality.com. From FIG. 10 "measure" can be seen to be a parameter 250 selected to be part of pattern 0 (designated 251 in macro mapping table 240).

In this instance the macro portion 241 includes one or more merge portion links 252. Each merge portion link 252 links to code which is a function of a meeting type descriptor 215 selected as a parameter 250 from the macro mapping table 240.

In a preferred form the code of the merge portion link 252 is also a function of the platform 242, 243, 244 upon which the code is to be executed.

FIG. 12 is a portion of the macro portion 241 which shows the questions html macro portion 241 for the web page platform 243 for pattern 0.

FIG. 13 shows a portion of the questions html macro portion 241 for the smartphone platform 244 for pattern 0.

FIG. 14 shows a portion of the results html macro portion 241 for the email platform 242 for pattern 0.

FIG. 15 shows a portion of the results html macro portion 241 for the web platform 243 for pattern 0.

FIG. 16 shows a portion of the results macro portion 241 for the smartphone platform 244 for pattern 0.

FIG. 17 is a schematic diagram illustrating the table driven methodology which forms the basis for a method of specifying and assembling macro portions such as macro portion 241 to execute either questionnaires 216 or results reports 218 as a function of meeting type descriptor 215 and/or platform 242, 243, 244.

In this instance macro portions 241 selected according to pattern 251 are transmitted from web enabled server 221 to the designated platform, in this instance selected from email platform 242, browser platform 243 or smart phone platform 244.

In each instance the macro portions 241 run within an application by an independent server 236. For example in the case of the smart phone application this may be downloaded from the Apple store having previously been provided to the Apple Store from system 10, 210.

In the case of the browser platform 243 the application may be, for example, Google Chrome provided from a Google sponsored server environment.

In the case of the email platform 242 the application may be Microsoft Outlook provided directly or indirectly from a Microsoft sponsored independent server 236.

In preferred forms macro portions 241 are made available to all platforms thereby permitting participants in meetings to utilise the platform of choice.

In all instances the responses of participants are returned to server 221 independent of whichever platform has been selected for use by the meeting participant.

Further examples of macro functions are as follows:
%kReadFile%k, %kMeetingQualityLogoBase64%k, %kSetActiveCalendar%k, %kRecurringModCount%k, %kIfEverybodyResponded%k, %kIfQResponseQ1P1, %kSetInstructor%k, %kScenarioList%k, %kRiskValueList%k, %kRiskValueAssCalendar%k, %kSalesReview1stMeeting%k, %kScenariosAssCalendar%k, %kWatsonSubset%k, %kUsersSameOrg%k, %kUsersDifferentOrg%k, %kUsersOrgIndividual%k, %kPartnerMeasureMeetings%k, %kPartnerStrategyMeetings%k, %kPartnerCatchupMeetings%k, %kPartnerCatchupMQSMPS%k, %kPartnerMPSChangeIdRecurring%k, %kUnallocatedProjectListDomain%k, %kDiversity%k, %kInput0to10Color%k, %kProgramAverage%k, %kContribution%k, %kQuestionsAsColumns%k, %kOrganizerEmployeeList%k, %kPartnerEmployeeList%k, %kProgramStakeholder%k, %kProgramGovernance%k, %kPortfolioGovernance%k, %kQuestionMeetingAverageBitMask%k, %kSalesReviewToSalesforceJson%k, %kGroupListComponents%k, %kGroupListAverage%k, %kCalendarProgramListMaster%k, %kDailyReport%k %kEMailNextResults%k, %kResponseCount%k, %kResponseHighestSelected%k, %kQuestionMeetingAverage%k, %kIfOrganizer%k, %kIfNotOrganizer%k, %kIfActionitems16Bit%k, %kActionitemEmail%k, %kAttendeeSameDomainAsOrg%k, %kAttendeeList%k, %kLastAttendeeScore%k, %kStringDependant%k, %kParticipantFirstMeeting%k, %kParticipantFinPlanMeeting%k, %kCoachReport%k, %kCoachReportByAttendee%k, %kCoachReportAttendeeDetails%k, %kProjectListDomain%k, %kProgramListDomain%k, %kPartnerCustomerList%k, %kPortfolioEmailProgramList%k, %kNetworkMapAttendeeMPS%k, %kReportList%k, %kQuadrant%k, %kLastMeetingMPSMin%k, %kLastMeetingMPSYou%k, %kLastMeetingMPSMax%k, %kAttendeeScore%k, %kLinkedResource%k, %kDrawTimeSeriesIfReqd%k, %kDrawBar3x3IfReqd%k, %kDrawBar5x2IfReqd%k, %kDrawScatterUserWithLabelIfReqd%k, %kDrawBarOverlayUserIfReqd%k, %kDrawNetworkDiagramIfReqd%k, %kMQProfilePersonal%k, %kQuadrantFirstChoice%k, %kQuadrantSelected%k, %kCalculate%k, %kIfExistsElse%k, %kSvgPolygonsWithJitter%k, %kWebPassword%k, %kWebEmailBasedPassword%k, %kUsersExceptCurrent%k,
%kUsersExceptCurrentQuadrant%k FIG. 18 is a schematic diagram illustrating servicing of multiple platforms.

In this instance, in response to a particular pattern selection the designated parameters 250 cause macro portions 241 to be transmitted from web enabled server 221 to respective platforms 242, 243, 244 as described above.

In a particular form a user may define a new parameter 250.

In a preferred form the new parameter is defined with the assistance of a portal executing on web enabled server 221.

In a preferred form the portal issues a macro portion to the platform in response to execution/invoking of a "new parameter" parameter in the macro mapping table.

In a particular form the parameter which the user may define is a new meeting type identified by a new meeting type email address 214A in the macro mapping table 240.

In a preferred form the system 10, 210 can generate a new parameter.

More preferably the system 10, 210 may generate the new parameter in response to a user invoking execution of a parameter.

In a preferred form the new parameter causes the generation of a report.

In a preferred form the report is in the form of a summary of responses to multiple meetings.

In a preferred form the multiple meetings can be recurring.

In this instance the macro mapping table has a number of patterns 251.

Each pattern may comprise a selection from a number of parameters. The parameters may include questions and responses and meeting type email descriptors.

Each pattern may be executable by macro code operable on a selection of platforms—for example 3 platforms (email, web page, smartphone).

Each pattern 251 is referred to by a subset of meeting type email addresses MTEAs 214.

With further reference to FIG. 18 there is illustrated:

A method of and system for assembling programme code for execution on a platform; said method and system comprising defining a first lookup table which maps specified parameters against specified patterns;

defining macro portions which are a function of a parameter and of a platform;

transmitting at least one selected specified macro portion specified in the first lookup table as a function of desired platform specified;

installing the at least one selected specified macro portion in an application on the platform;

executing the at least one selected specified macro portion on the platform.

In a preferred form the macro portions include merge portion links; each merge portion link linking to code which is a function of a parameter.

In a preferred form a user may define a new parameter in the first lookup table.

In a preferred form the new parameter is defined by use of a portal executing on the web enabled server.

In a particular preferred form the parameter is in the form of a meeting type descriptor.

In a preferred form the first lookup table is a macro mapping table.

In a preferred form a specified parameter includes a meeting type email address.

In a preferred form a specified parameter includes a question element.

In a preferred form a specified parameter includes a response element.

In a preferred form transmission is a function of meeting participant email address.

In a preferred form the platform is an email platform.

In a preferred form the platform is a browser platform.

In a preferred form the platform is a smart phone platform.

In a preferred form the application is a browser.

In a preferred form the application is an application executable on a smartphone.

In a preferred form the application is an email application executable on a digital device.

Pulse Survey

With reference to FIG. 18, there is provided a pulse survey functionality. A senior manager, normally the CEO or their assistant, sends a (possibly recurring) calendar invite to each team in an organisation and pulse@meetingquality.com. Individuals complete the survey as discussed above. Each team member receive results 24 hours later. A MeetingQuality implementation partner can send a calender invite to partnerpulse@meetingquality.com. They will be prompted to select a customer from an allowed list and will then be presented with a list of pulse surveys from that particular customer which they can then aggregate to produce reports by Group or division or the whole company. In addition other attributes can be combined in the report. For instance MQprofile or any of the personality type questions can be combined with partnerpulse. The preceding functionality is also available through the portal on FIG. 18.

Third-Party Access

Reports can be requested by authorised persons. The first type is from individuals inside an organisation eg program@meetingquality.com. For MeetingQuality implementation partners that provide interpretation services reports are provided for authorised customers. Eg partnerprogram@meetingquality.com. They can be initiated using the calendar invite or through the portal.

The existing functionality works is illustrated using project below:

1) Third party authorization is set up for MeetingQuality Implementation Partner (MIP)
2) MIP invites partnerrogram@meeitngquality.com to a recurring meeting
3) MQ server responds with acceptance and inside the acceptance email is a link to the portal. Note this is different to the link to associate recurring meetings with this particular instance.
4) When MIP enters portal they are prompted to choose a customer from the authorised list
5) A list of portfolios and programs (including the calendar invite they have just created) is available to be selected
6) Once a program or portfolio has been selected MIP can add as many meetings as they like to the program
7) The report will be generated at the time specified by the calendar invite
8) Similar reports can be generated by partnercustomer@meetingquality.com, partnercoach@meeitngquality.com, partnerinterview@meetingquality.com, partnerpulse@meetingquality.com and partnerrisk@meetingquality.com.
9) MIP will be able to define their own reports using the functionality to create questions 10) Their newly created report type will be available to be selected and meetings which it will be used on will be selected in step 6) above.

Language Support

Surveys and results can be in any language. The email address is modified to include the two letter country code. For instance the Swedish language version of measure@meetingquality.com is measure.se@meetingquality.com. A user can set their default language such that any surveys or results are delivered in their default language. In the preceding example the meeting organiser could send a calendar invite to multiple participants and measure@meetingquality.com. A person who had set their default language to Swedish would receive surveys and results as though the organiser had invited them using Measure.se@meetingquality.com.

Data Location

The location of data can be set by the domain name in the email address of the survey. For instance, inviting measure@meetingquality.co.uk will store data in the United Kingdom. Inviting measure.se@meetingquality.com will send a Swedish language version but store data in the United States. Inviting measure.se@meetingquality.se will send a Swedish language version and store data in Sweden.

Communication Drop

Figure 8A:
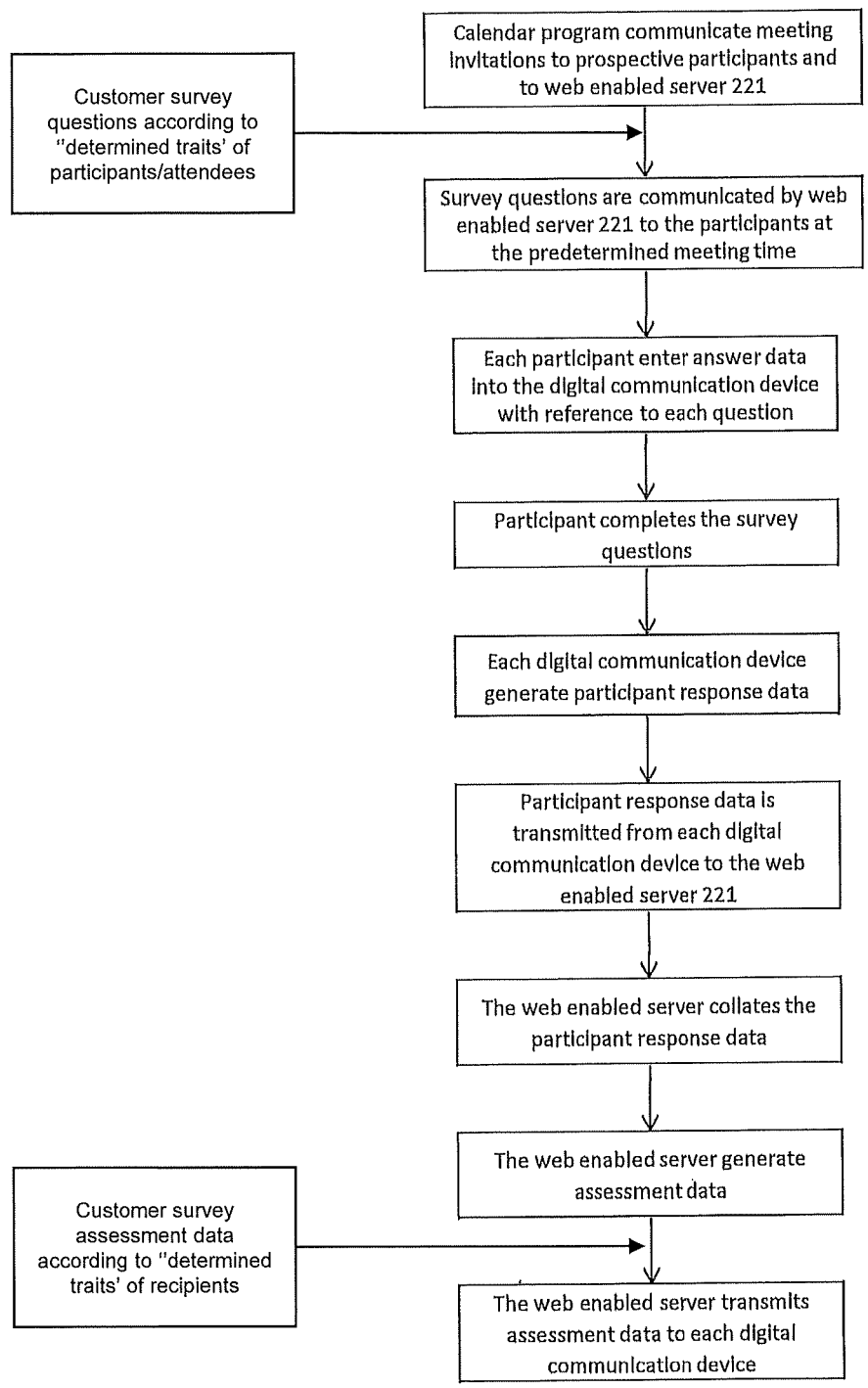
FIG. 8A is a flowchart of the operation of the system where additional communications are customized for each receiver/participant/attendee.
Figure 8A:
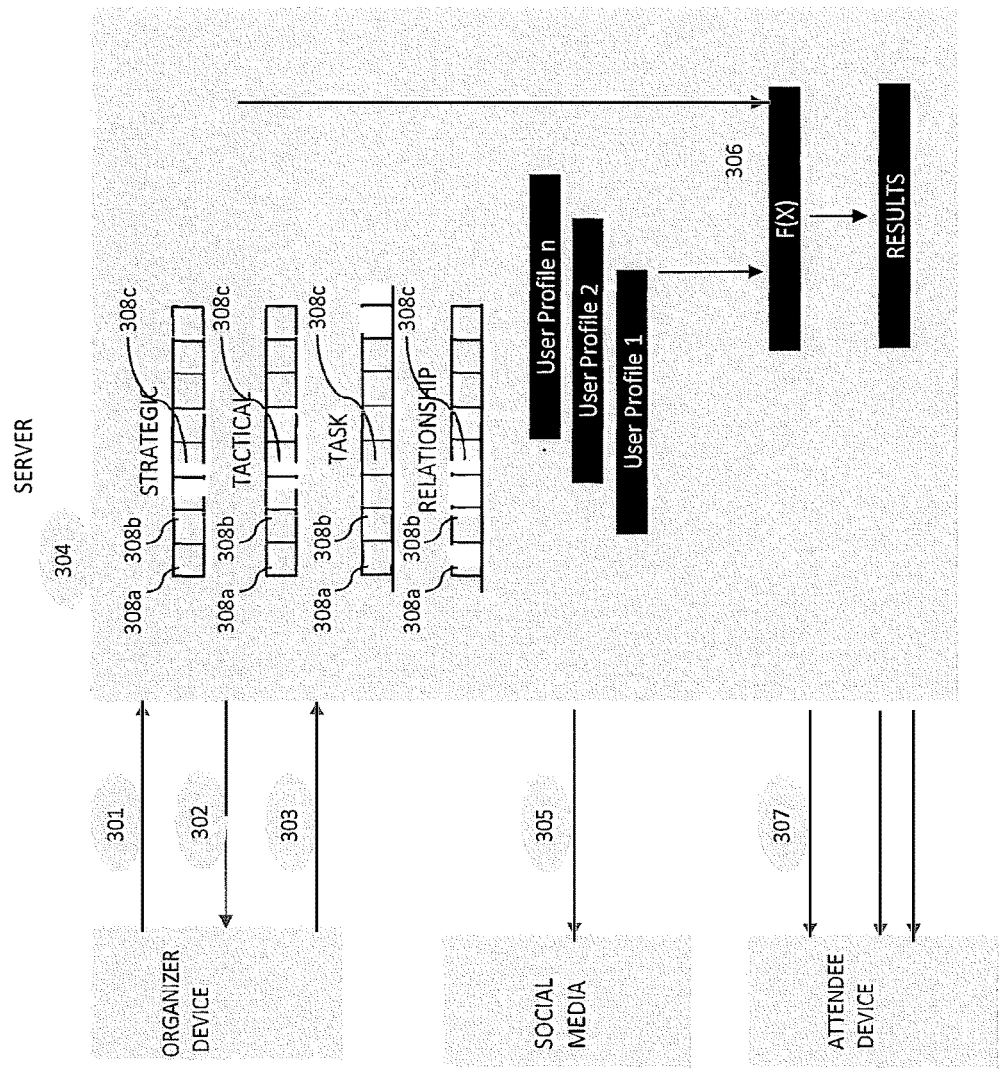

With reference to FIG. 8A and FIG. 8AA, the portal may provide a facility for additional communication to be added to meeting results as compared with the flowchart of FIG. 8. A group of people can be selected as the attendees of a meeting or any of the aggregated meeting types eg program or partner customer or pulse. The communication in the form of additional material will be added to any Communication that is to be sent by MeetingQuality within the specified timeframe. If no communications are sent during this time optionally a message comprising the additional material can be sent anyway. The additional material forming part of the communication can be phrased differently to suit determined traits of each receiver/participant/attendee. In a preferred form each item of the additional material can be rendered as four different Messages—each message phrased differently to suit the determined traits from a grouping of four traits. For instance the same message could be written four different ways to appeal to attendee having traits which might categorize them as fitting most closely to one of a strategic thinker, a tactical person, a relationship based person or a task based person. The four separate messages can be manually loaded or suggestions provided by artificial intelligence can be used. MeetingQuality will send the communication most likely to resonate with the receiver. That is send the strategic communication to the strategic thinker and tactical communication to the tactical thinker etc. without the author of the message being aware of the trait of each individual receiver. MeetingQuality is able to determine the trait of each individual through a combination of external social media posts and tweets and internal results provided for and about an individual.

With reference to FIG. 8AA, the traits of the receiver/participant/attendee are determined with reference to social media. Specifically the following steps can be followed with reference to FIG. 8AA:

301. Organizer creates calendar invite and sends to commsdrop@meetingquality.com
302. If the Organizer is authorized a specific survey is sent to the organizer.
303. Organizer responds to survey. The entire process is described in FIGS. 9a-f and 10 is used to store a group of meetings and one or more paragraphs of text or additional material.
304. The text or additional material is converted into one of four types which will appeal to a strategic person, a tactical person, a task oriented person and relationship oriented person either manually or through artificial intelligence suggestions.
305. In a particular enhanced form, each individual has their user profile updated with a percentage score for Strategic, Tactical, Task or relationship calculated through their answers to survey questions, answers about them (especially contribution) and social media and other public information. For example LinkedIn featured skills and endorsements.
306. If the results is for a group of meetings selected in 303 then the user profile is checked to see the specific combination of paragraphs to be sent to that specific user. In this instance the text or additional material for each trait comprises sub-portions 308a, 308b, 308c . . . . . The final text or additional material to be added will comprise sub-portions in a ratios corresponding to trait ratios of the individual. Each attendee is calculated individually and added to the results as specified in the macro mapping table.
307. Each individual is sent their results on their preferred device.

The determination of the traits of each receiver/participant/attendee may be performed manually or by AI editing. The AI editing may be performed with reference to information derived from a social media profile. In alternative forms the editing may be performed with reference to information derived from answers provided by each receiver/participant/attendee to previous questions. This may be particularly relevant where the receiver/participant/attendee does not have a social media profile. More particularly the answers may be from answers provided in recurring sets of meetings. In a further particular form the editing may be performed with reference to information derived from perceptions of other receivers/participants/attendees as part of the survey system.

Information may be derived from social media profiles (LinkedIn profile, including personal info like profile photo, gender, age, background, education etc. and recommendations) and history (tweets/posts). In a particular form where traits relate to emotion, then measuring the emotional tones including external and internal results may determine the pressure level of the endeavor.

It will be understood that the module described with reference to FIG. 8AA may be utilized to provide additional material to complement material being sent at any stage in operation of the system.

In Use

In a particular form, in use, a user operates the system 10, 210 as follows:

A meeting organiser sends a calendar invitation for a meeting utilising a meeting scheduling program of choice—such as, for example, Microsoft Outlook.

The calendar invitation includes a meeting type descriptor 215 as a participant resulting in an invitation being extended to system 10, 210 executing on a web enabled server 221 whereby the system 10, 210 receives a list of email addresses of all participants proposed for the meeting. As a consequence it also receives the meeting start time information.

As a result, at the time of the meeting start time the server 221 sends a questionnaire corresponding to the meeting type descriptor to each participant.

In one form the transmission may be by way of an email which includes the questionnaire within its body.

In a further form the transmission may be by way of an email that includes a hyperlink which a recipient clicks upon to connect to the Web enabled server whereby the questionnaire appears in a browser.

In a further form the transmission may be to an application executing on a smart phone whereby the questionnaire is shown on a display of the smart phone.

The step of communicating survey questions further includes the step of providing a subset of the questions, possibly one, to be asked as a set of multi choice, radio button or check box like links. Each link is unique and corresponds to a complete answer. The link contains the selective value of the individual choice, answers previously supplied either from smartphone or when the link has been previously used. If not previously scored then the default value as described above is used. The link also contains an identifier for the user that is unique to this meeting. In addition each link contains a unique one-time password which is tamperproof. Selecting on the link updates the database with the explicit selection and the implicit selections contained within the link. The only exception to this is where the default values have been used but in the meantime the same user from another device has explicitly updated their answers, in which case the implicit values are ignored. The user is then presented the results and the opportunity to change or update any of their answers.

As the meeting progresses the participants responded to the questionnaire causing transmission of answers to the questions in the questionnaire to the Web enabled server 221 which collates the answers and transmits back to each participant to the same application running on the same platform from which the questionnaire was opened meeting assessment data 233 which may be in the form of reports 18, 218 and/or scores 19, 219.

In one embodiment, where the platform is an iPhone the questionnaire is requested from the web enabled server using the json protocol.

Defining New Parameters.

In a particular instance the system 10, 210 or, in a further instance a user may seek to define new parameters 250 for the macro mapping table 240. In a further instance the user may seek to define a new parameter in the process of which the system defines a new parameter 250. In such instance use may proceed as follows:

User operates an application on a preferred platform—for example web site, smartphone or email. This is particular form of the email address, macros and pattern.

The user is offered either:

An existing pattern to change the text of the questions and responses or

A list of parameters to select any number of radio buttons, checkboxes, 0-5, 0-10, 0-100, scoring of each participant or free format text etc and a list of text and graphs to be used for the responses.

When the user submits the total list of questions and responses they are added as a merge portion link to the macro mapping table and a new meeting type email address is added to the email list.

The user can then provide the newly added meeting type email address to anybody so that their new set of questions may be used for any meeting by adding the new email address to the meeting invite.

Sets of Associated Meetings can be Defined by the User:

One set of associated meetings is 3 meetings each of them recurring: executive meeting, operational meeting and stakeholder meeting. An example of this is for a project where the executive meeting would be a steering committee meeting, the operational meeting would be the project team meeting and a stakeholder meeting is the same in this case. The cross meeting reporting is defined by a fourth email address.

User goes to either web site, smartphone or email. This is particular form of the email address, macros and pattern.

User is offered a similar set of questions as above but in addition the questions and responses can be defined as common to each of the 3 types of meetings or for only one of the types of meetings.

User is offered a similar set of responses as above however the tables and graphs compare the results across multiple recurring meetings in the set. This will generate another email type which allows a user to choose which of the individual meetings join the set after they have occurred.

This option generates 4 email addresses which can be used:

Email address for the executive meeting

Email address for the operational meeting

Email address for the stakeholder meeting

Email address to select associated meetings which will provide the cross meeting reporting as defined by the user.

INDUSTRIAL APPLICABILITY

Embodiments of the invention may be applied in the field of project management with a view to improving the efficiency and timeliness of delivery of projects—preferably complex projects such as may be encountered in building construction, aircraft construction and the like. Embodiments of the invention may also be applied in relation to projects, customer acquisition, coaching, recruitment, safety, risk or culture.

In particular form the traits of Emotion, Relationships and Perception may be utilized to predict if projects will be successful and present this in a portfolio view which can be used by implementation partners to improve project success. Similarly with customer acquisition providing visibility of Emotion, Relationships and Perception the system may provide information to be able the customer to reduce average days to sale, decrease discounting and reduce the number of zombie opportunities.

The invention claimed is:

1. A method of assembling program code for execution on a platform; said method comprising
    defining a first lookup table which maps specified parameters against specified patterns;
    defining at least one macro portion which is a function of a parameter and of a platform;
    transmitting the at least one selected specified macro portion specified by a parameter in the first lookup table as a function of the platform;
    installing the at least one selected specified macro portion in an application on the platform;
    executing the at least one selected specified macro portion on the platform;
    wherein a survey is created at runtime on said platform by executing ones of said macro portions utilizing at least one of: instantaneous conditions, meeting data, recurring meeting data, historical data, artificial intelligence or user-defined data.

2. The method of claim 1 wherein the macro portions include merge portion links;

each merge portion link linking to code which is a function of a parameter.

3. The method of claim 1 wherein a user may define a new parameter in the first lookup table.

4. The method of claim 3 wherein the new parameter is defined with the assistance of a portal executing on the web enabled server.

5. The method of claim 4 wherein the portal issues a macro portion to the platform in response to execution/invoking of a "new parameter" parameter in the macro mapping table.

6. The method of claim 5 wherein the parameter which the user may define is a new meeting type identified by a new meeting type email address in the macro mapping table.

7. The method of any one of claim 1 wherein the method can generate a new parameter or in response to a user invoking execution of a parameter or the new parameter is a meeting type.

8. The method of claim 7 wherein the new parameter causes reports in the form of a summary of responses to multiple meetings which can be recurring.

9. The method of claim 1 wherein the parameter is in the form of a meeting type descriptor.

10. The method of claim 1 wherein the first lookup table is a macro mapping table.

11. The method of claim 1 wherein a specified parameter includes a meeting type email address.

12. The method of claim 1 wherein a specified parameter includes a question or a response element.

13. The method of claim 1 wherein transmission is a function of meeting participant email address.

14. The method of claim 1 wherein authorized users are granted the right to schedule reports on aggregated meetings from specific customers or the reports may take the form of standard reports such as program or sales review reports or reports from sets of associated meetings defined by the users with parameters defined that can also defined by users.

15. The method of claim 1 further including a portal which provides a facility for additional communication to be added to a communication made by the method.

16. The method of claim 15 wherein the additional communication takes the form of the communication being phrased differently to suit traits of strategic thinker, tactical person, relationship based person or task based person.

17. The method of claim 16 wherein each additional communication is comprised of sub-portions and wherein proportions of the sub-portions for each trait are apportioned according to the proportion of each trait of the receiver.

18. The method of claim 17 wherein a group of people can be selected as the attendees of a meeting or any of the aggregated meeting types and wherein an additional communication will be added to any communication that is to be sent within the specified timeframe.

* * * * *